(12) United States Patent
Hamada et al.

(10) Patent No.: US 6,606,558 B2
(45) Date of Patent: Aug. 12, 2003

(54) RENDERING DEVICE AND METHOD

(75) Inventors: Hiroyuki Hamada, Yawata (JP);
Kiyomi Sakamoto, Ikoma (JP);
Teruaki Ata, Osaka (JP); Yuji Hamada, Setagaya-ku (JP); Atsushi Yamashita, Osaka (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 10/096,796

(22) Filed: Mar. 14, 2002

(65) Prior Publication Data

US 2002/0133291 A1 Sep. 19, 2002

(30) Foreign Application Priority Data

Mar. 15, 2001 (JP) ........................................ 2001-074616

(51) Int. Cl.$^7$ ............................................. G01C 21/00
(52) U.S. Cl. ..................... 701/211; 701/200; 340/995
(58) Field of Search ................................. 701/200, 207, 701/208, 211, 212, 213; 340/988, 995

(56) References Cited

U.S. PATENT DOCUMENTS 5,742,924 A * 4/1998 Nakayama ................. 701/208

FOREIGN PATENT DOCUMENTS

| EP | 0 777 206 | 6/1997 |
|---|---|---|
| EP | 1 024 467 | 8/2000 |
| JP | 09-152354 | 6/1997 |
| JP | 2000-276609 | 10/2000 |

* cited by examiner

Primary Examiner—Yonel Beaulieu
(74) Attorney, Agent, or Firm—Wenderoth, Lind & Ponack, L.L.P.

(57) ABSTRACT

In a navigation device (Unv), a processor 1 reads directional object data (Ddr) from a storage 4 onto a working area 3. The directional object data (Ddr) has a message plane and a plain plane, thereby representing a directional object whose planes are each facing in a different direction. Based on the positional relationship between the user's current position and the directional object, the processor 1 determines whether to render the message plane or the plain plane of the directional object. In the case of the message plane, the processor 1 renders it opaque. On the other hand, the processor 1 renders the plain plane transparent or translucent. In this manner, the resulting display image data generated by the navigation device (Unv) can represent maps meeting the user's demands and needs

13 Claims, 21 Drawing Sheets

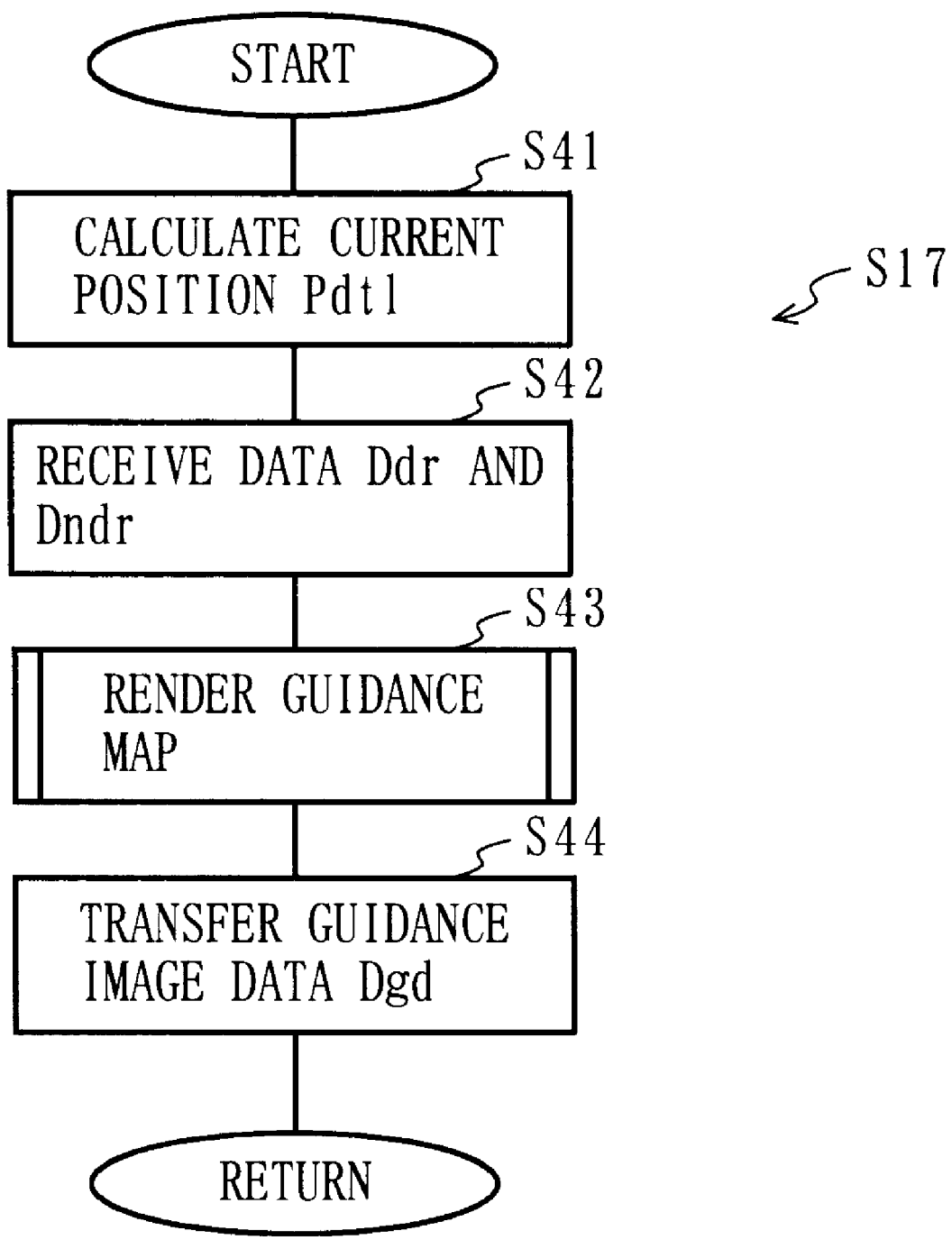

RENDERING DEVICE AND METHOD

BACKGROUND OF THE INVENTION

1. Field of the Invention

The present invention relates to rendering devices and, more specifically, to a rendering device for generating display image data representing maps on a display.

2. Description of the Background Art

The above type of rendering device has often been incorporated in a navigation device. EP Patent No. 1,024, 467, Japanese Patent Laid-Open Publication No. 2000-276609, and EP Patent No. 777,206 each disclose such a navigation device with the rendering device incorporated therein. In this Description of the Background Art section, those navigation devices are respectively referred to as a first, second, and third navigation devices in that order. These navigation devices are each described below for a rendering process executed therein.

In a rendering process, in the first navigation device, a distance from the current vehicle position to any object to be rendered which is located in a close range of the vehicle position is calculated. If the calculated distance is equal to a predetermined threshold value or smaller, the object is three-dimensionally rendered. On the other hand, if the calculated distance exceeds a predetermined threshold value, the object is two-dimensionally rendered, thereby resulting in a lower viewability as compared with the object which is three-dimensionally rendered. Herein, the object denotes an element of a display map, e.g., a building.

In the second navigation device, a distance from the current vehicle position to any object to be rendered which is located in a close range of the vehicle position is also calculated. Based on the calculated distance, a color density of the object to be rendered is determined. Herein, the object denotes a polygon representing a road in a display map.

In the third navigation device, a route search is first completed for guiding the vehicle. When the vehicle comes within a predetermined range of each intersection on the found route, any objects (typically landmarks) in the vicinity of the road leading to the intersection are to be rendered on a map.

The problem with the third navigation device, however, is that, as in the first and second navigation devices, changing the manner of rendering the objects based on their distance from the vehicle position to the target object often fails to result in maps meeting the users' demands and needs.

Referring to FIGS. 22A to 22C, the problem is described in more detail. FIG. 22A shows an intersection C1 to which first to third roads W1 to W3 are connected. Presumably, the vehicle is allowed to go through the intersection C1 from the first road W1 to the second road W2, but the vehicle is prohibited to go in the opposite direction, i.e., from the second road W2 to the first road W1. Under such a presumption, there is a "No Entry" sign TS1 provided in the vicinity of the intersection C1. As shown in FIG. 22B, the road sign TS1 shows a message on a main plane TS11 facing the second road W2, but as shown in FIG. 22C, its opposite plane TS12 facing the first road W1 shows no message.

When the vehicle approaches the intersection C1 coming from the direction of the second road W2, the first and second navigation devices display a map as shown in FIG. 22B. With such a map, the user in the vehicle will see the plane TS11.

On the other hand, if the vehicle approaches the intersection C1 coming from the direction of the first road W1, displayed on the first and second navigation devices is a map as shown in FIG. 22C. In this displayed map, the plane TS12 shows no message of "No Entry", and thus there is no need to include the road sign TS1 as long as the user sees the object from the first road W1 side. Even so, the first and second navigation devices both fully and clearly render the plane TS12 of the road sign TS1 as an object. As a result, the road sign TS1 blocks the user's view in the displayed map for the area therebehind, which is a part of the driving area in which the user wants to see rather than the plane TS12 of the road sign TS1 which has no beneficial use in this case. This proves that changing the manner of rendering objects based on the calculated distance as by the first and second navigation devices is not an ideal answer for generating maps which meet users' demands and needs, and thus is not considered driver friendly.

The third navigation device bears the same problem as described above referring to FIGS. 22A to 22C, because objects on roads in the direction to which a user travels are explicitly rendered thereby.

SUMMARY OF THE INVENTION

Therefore, an objective of the present invention is to provide rendering devices capable of generating display image data adequately in order to represent maps which are considered driver friendly, that is, those meeting users' demands and needs.

The present invention has the following features to attain the above objective.

A first aspect of the present invention is directed to a rendering device for generating display image data which represents a map to be displayed on a display. The rendering device comprises a first reception section for externally receiving directional object data having a plurality of planes each facing a different direction. The directional object data includes direction information specifying in which directions the planes are each facing. The rendering device further comprises a rendering section for rendering, based on a positional relationship between a user's current position and the direction information specifying in which directions the planes.are each facing, the planes of the directional object in each different manner to generate the display image data. According to the present invention, the user's current position changes the manner of rendering the directional objects, whereby the resulting display image data can represent maps meeting the user's demands and needs.

These and other objects, features, aspects and advantages of the present invention will become more apparent from the following detailed description of the present invention when taken in conjunction with the accompanying drawings.

BRIEF DESCRIPTION ON OF THE DROWNINGS

FIG. 15 is a detailed flowchart of step S17 of FIG. 8;

DESCRIPTION OF THE PREFERRED EMBODIMENTS

Figure 1:
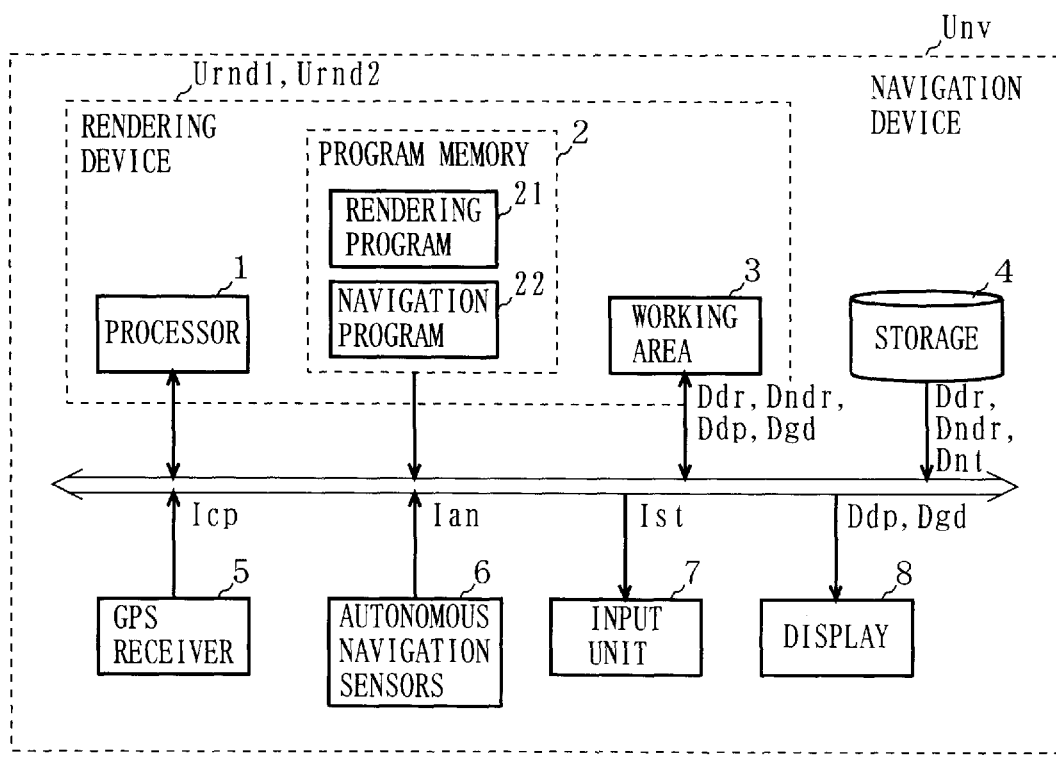
FIG. 1 is a block diagram showing the hardware structure of a rendering device Urnd1 according to a first embodiment of the present invention, and a rendering device Urnd2 according to a second embodiment of the present invention.

FIG. 1 is a block diagram showing the hardware structure of a rendering device Urnd1 according to a first embodiment of the present invention. Referring to FIG. 1, the rendering device Urnd1 generates display image data Ddp representing a map to be displayed on a display 8, and display image data Dgd for guidance (hereinafter, guidance image data Dgd). The rendering device Urnd1 includes a processor 1, a program memory 2, and a working area 3. The processor 1 is typically a CPU (Central Processing Unit), or an MPU (Micro Processing Unit). The program memory 2 is typically ROM (Read Only Memory), and stores a computer program 21 for rendering (hereinafter, rendering program). In the present embodiment, the rendering device Urnd1 is presumably incorporated in a navigation device Unv. Therefore, the program memory 2 also stores a computer program 22 for navigation (hereinafter, navigation program), and in accordance therewith, the processor 1 executes processes needed for navigation. The working area 3 is typically RAM (Random Access memory), and is used when the processor 1 executes the rendering program 21 and the navigation program 22. In FIG. 1, to realize the navigation device Unv, the processor 1 of the rendering device Urnd1 is connected to a storage 4, a Global Positioning System (GPS) receiver 5, autonomous navigation sensors 6, an input unit 7, and a display 8 to carry out data communications therewith.

Figure 2:
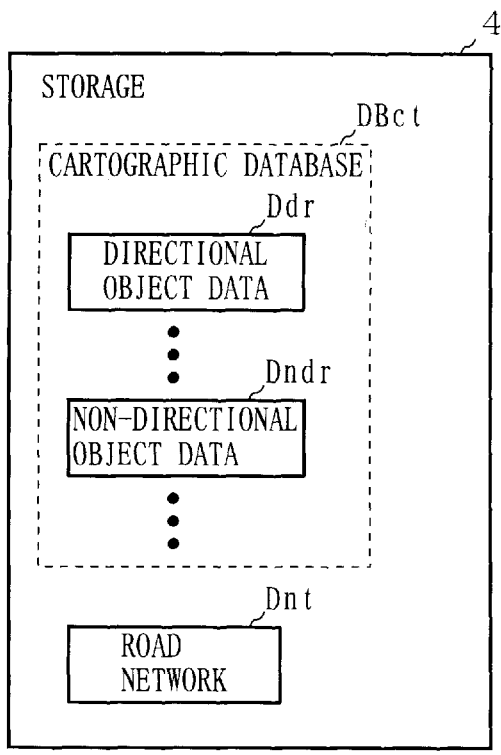
FIG. 2 is a schematic diagram of a cartographic database DBct and road network data Dnt which are to be stored in a storage 4 of FIG. 1.

Referring to FIG. 2, the storage 4 stores a cartographic database DBct. For a route search by the navigation device Unv, the storage 4 also stores road network data Dnt.

The cartographic database DBct includes directional object data Ddr and non-directional object data Dndr, both of which represent map elements for rendering any specific wide-range maps exemplified by a map of Japan. Here, the map elements are typified by buildings, road signs, billboards, roads, city blocks, and greenbelts. The directional object data Ddr and the non-directional object data Dndr are used as a basis of both the display image data Ddp and the guidance image data Dgd to be generated by the rendering device Urnd1.

Figure 3A:
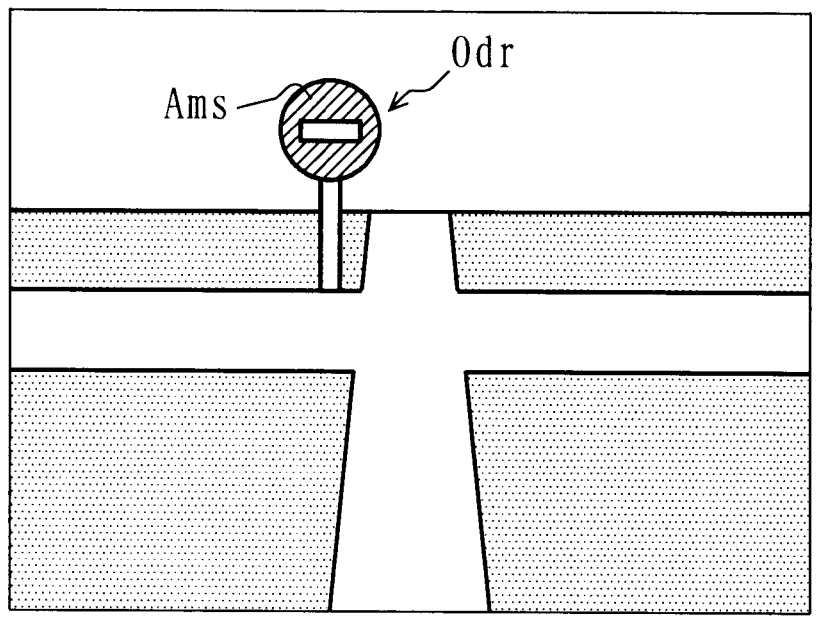
FIGS. 3A and 3B are illustrations demonstrating a directional object Odr.
Figure 3B:
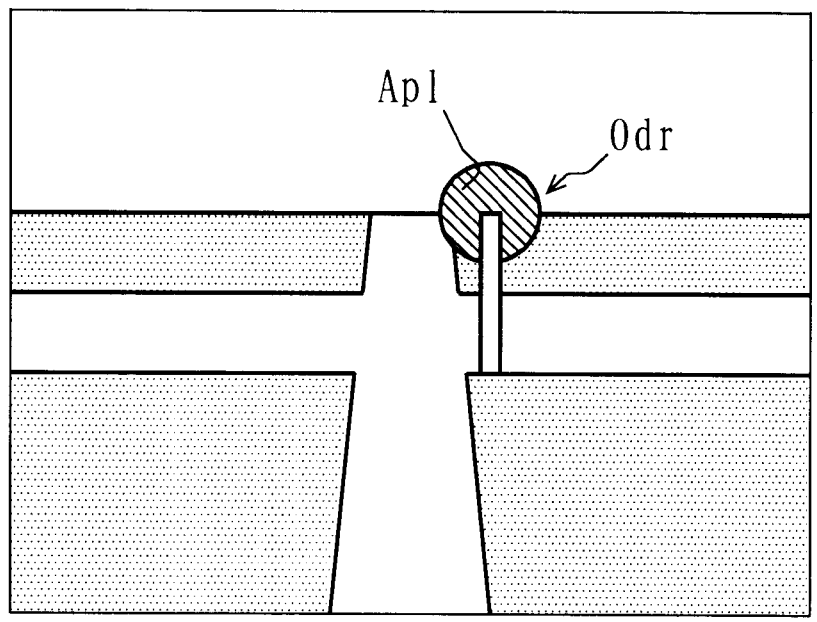

The directional object data Ddr represents the directional object Odr. As shown in FIG. 3A, the directional object Odr has a message plane Ams on which a message is provided for anyone, i.e. users, seeing the map on the display 8. The directional object Odr also has a plain plane Apl which carries no message for the users, as shown in FIG. 3B. In the present embodiment, the meaning of the term "directional" is characterized in that the user's current position decides which of the message plane Ams and the plain plane Apl is perceived by the user.

As a specific example of the directional object Odr, FIGS. 3A and 3B both show a road sign of "No Entry". The message plane Ams of FIG. 3A shows a message for the users not to drive onto the road, while the plain plane Apl of FIG. 3B, which is the opposite plane to the message plane Ams, carries no such message. The issue here is that, assuming that FIGS. 3A and 3B represent the actual views, the directional object Odr in FIGS. 3A and 3B blocks the user's view, and the user accordingly cannot see the area hidden behind the directional object Odr.

Figure 4:
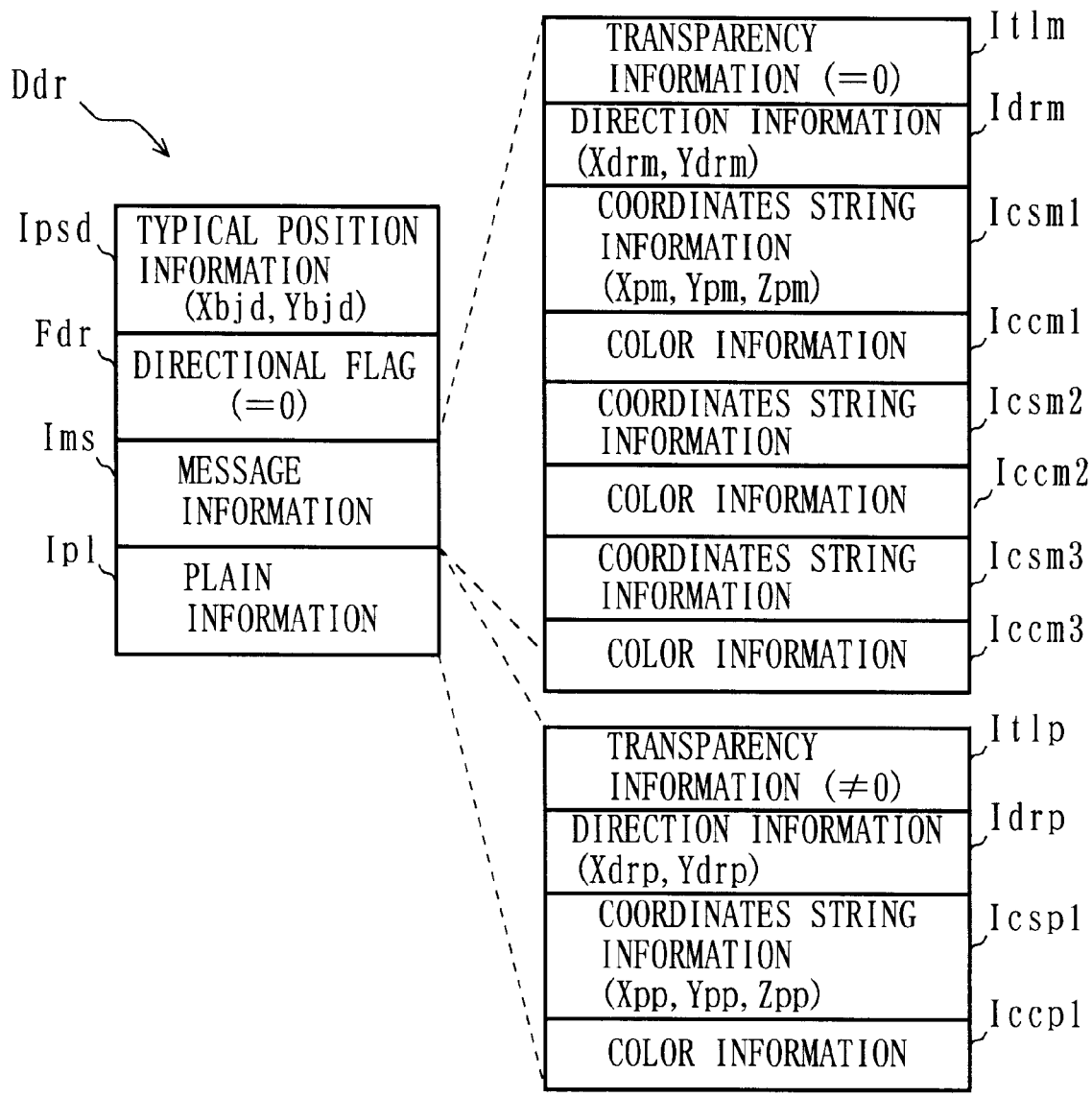
FIG. 4 is a schematic diagram showing the structure of directional object data Ddr representing the directional object Odr shown in FIGS. 3A and 3B.

In order to represent such a directional object Odr, the directional object data Ddr is structured as shown in FIG. 4. Referring to FIG. 4, the directional object data Ddr includes typical position information Ipsd, a directional flag Fdr, message information Ims, and plain information Ipl.

The typical position information Ipsd defines the directional object Odr by position according to where such a directional object is typically located. The typical position is specified normally by a set of latitude and longitude coordinates Xbjd and Ybjd, respectively.

The directional flag Fdr is information used for specifying the directional object data Ddr. In the present embodiment, the directional flag Fdr is previously assigned with a value of "0". Using such a directional flag Frd, the processor 1 distinguishes the directional object data Ddr from the non-directional object data Dndr.

The message information Ims defines, by shape and color, the message plane Ams of the directional object Odr. More specifically, the message information Ims includes transparency information Itlm, direction information Idrm, and several pairs of coordinates string information Icsm and color information Iccm. The transparency information Itlm defines in what transparent gradient the message plane Ams is to be rendered. Here, the message plane Ams needs to visually convey the message to the user clearly, and to meet this requirement, the transparent gradient for the message plane Ams is preferably selected to be "0", which denotes opaque in the present embodiment.

The direction information Idrm is a two-dimensional vector (Xdrm, Ydrm) indicating in which direction the message plane Ams is facing. Here, Xdrm and Ydrm are components along the latitude and longitude directions, respectively, in the displayed map.

Figure 5A:
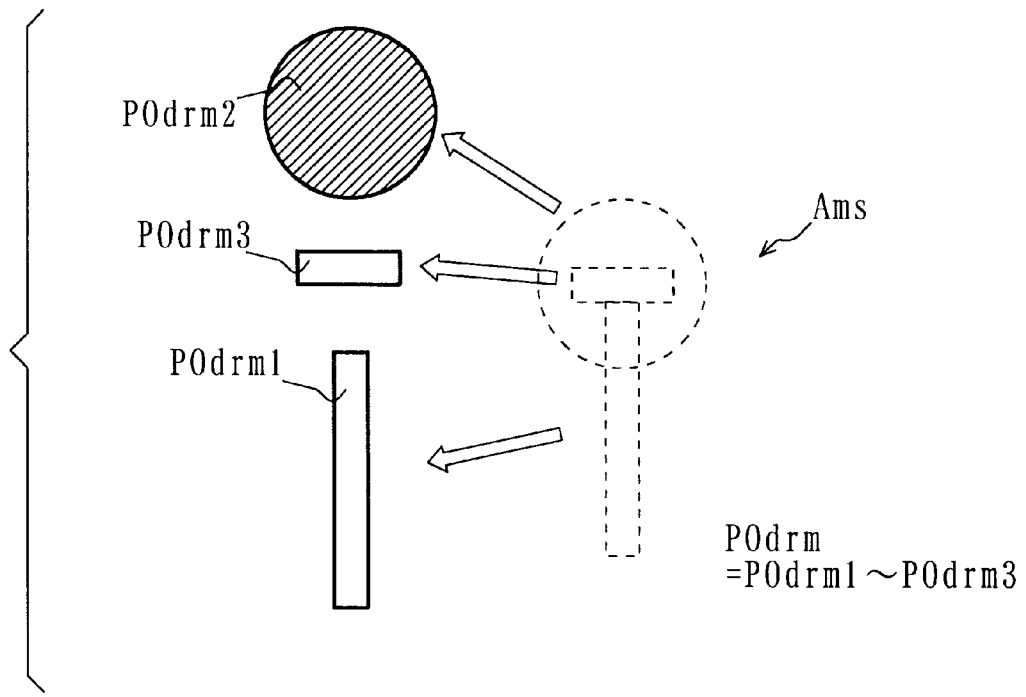
FIGS. 5A and 5B are illustrations demonstrating in detail a message plane Ams and a plain plane Apl of FIGS. 3A and 3B.

The pairs of the coordinates string information Icsm and the color information Iccm are each provided as object parts POdrm, which are structural elements of the message plane Ams as shown in FIG. 5A. In other words, there is a one-to-one relationship between the object parts POdrm and the pairs of the coordinates string information Icsm and the color information Iccm. Here, the object parts POdrm are all primitive, and the message plane Ams is not complete until every object part POdrm is rendered. The coordinates string information Icsm of FIG. 4 includes a plurality of three-dimensional coordinates (Xpm, Ypm, Zpm), with which an object part Podrm is defined by outline. Herein, Xpm is a latitude coordinate, Ypm is a longitude coordinate, and Zpm is a height coordinate. The coordinates string information Icsm also includes connection information about how those three-dimensional coordinates are specifically connected to one another. Generally, in the coordinates string information Icsm, those three-dimensional coordinates are so arranged that the object part POdrm can be drawn in a stroke, and the connection information accordingly indicates the resulting order. The color information Iccm defines with what color the object part POdrm is to be filled.

Here, the coordinates string information Icsm and the color information Iccm are both specifically exemplified. The message plane Ams of FIG. 3A is presumably composed of three object parts POdrm1 to POdrm3 as shown in FIG. 5A. In detail, the object part POdrm1 is a pole part of the road sign, the object part POdrm2 is a circular-shaped part, i.e., the main body of the road sign, and the object part POdrm3 is a white line part, which is to be drawn on the main body of the road sign. Under such a presumption, as shown in FIG. 4, the message information Ims includes three pairs of the coordinates string information Icsm1 and the color information Iccm1, the coordinates string information Icsm2 and the color information Iccm2, and the coordinates string information Icsm3 and the color information Iccm3. The pair of the coordinates string information Icsm1 and the color information Iccm1 corresponds to the object part POdrm1, which is the pole part. The coordinates string information Icsm1 is composed of several three-dimensional coordinates for defining the pole part by outline. The color information Iccm1 defines the color to fill in the pole part. The pair of the coordinates string information Icsm2 and the color information Iccm2 corresponds to the object part POdrm2 to define the main body of the road sign by outline and color. The pair of the coordinates stringy information Icsm3 and the color information Iccm3 corresponds to the object part POdrm3 to define the white line part of the road sign by outline and color.

With the plain information Ipl of FIG. 4, the plain plane Apl of the directional object Odr is defined by shape and color. In more detail, the plain information Ipl includes transparency information Itlp, direction information Idrp, and a pair of coordinates string information Icsp and color information Iccp. The transparency information Itlp defines in what transparent gradient the plain plane Apl is to be rendered. As described in the Description of the Background Art section, the users often prefer seeing the area behind the plain plane Apl than seeing the plain plane Apl itself which carries no message. Therefore, the transparent gradient for the plain plane Apl is selected to be a value not "0", which denotes transparent or translucent.

The direction information Idrp of the plain plane Apl is a two-dimensional vector (Xdrp, Ydrp) indicating in which direction the plain plane Apl is facing. Here, Xdrp is a component along the latitude direction on the displayed map, and is equivalent to −Xdrm. Similarly, Ydrp is a component along the longitudinal direction on the displayed map, and is equivalent to −Ydrm. That is, the plain plane Apl is facing in the opposite direction of the message plane Ams.

Figure 5B:
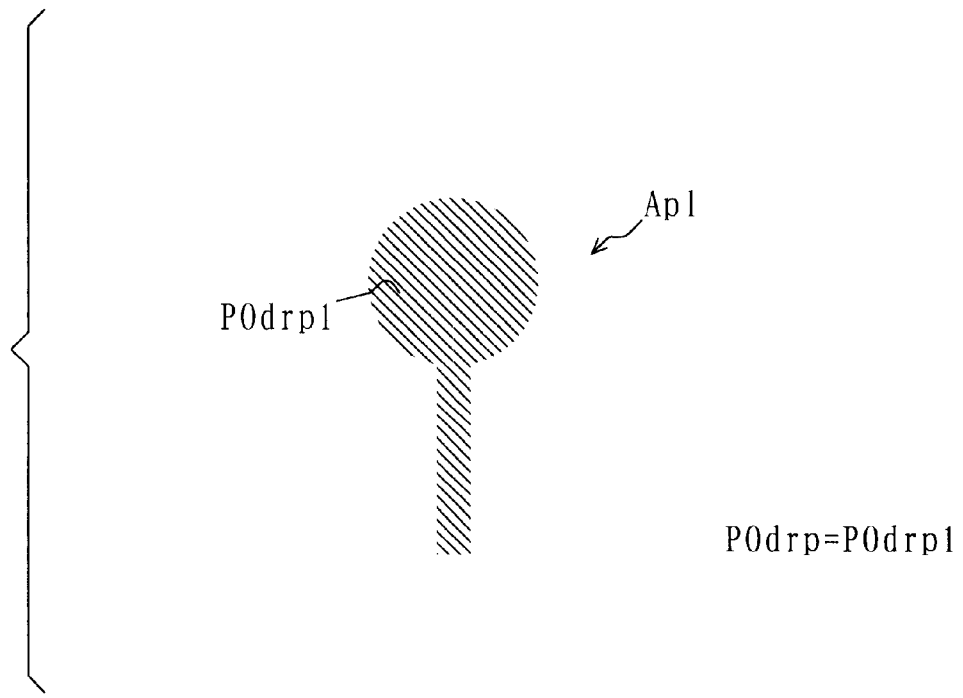

The pairs of the coordinates string information Icsp and the color information Iccp are each provided as object parts POdrp, which are structural elements of the plain plane Apl as shown in FIG. 5B. Here, as are the object parts POdrm, the object parts POdrp are also all primitive, and the plain plane Apl is not complete until every object part POdrp is rendered. It should be noted here that, even if the message plane Ams and the plain plane Apl belong to the same directional object Odr, those shapes are not always disassembled into the same primitives. That is, the object parts POdrp and POdrm are not always the same. The coordinates string information Icsp of FIG. 4 includes, similar to the coordinates string information Icsm, a plurality of coordinates (Xpp, Ypp, Zpp), and at least a unit of connection information, whereby an object part POdrp is defined by outline. The color information Iccp defines the color to fill in the object part POdrp.

Here, the coordinates string information Icsp and the color information Iccp are specifically exemplified. The plain plane Apl of FIG. 3B is assumed to be renderable by a piece of object part POdrpl, which is solely in charge of the backside of the road sign as shown in FIG. 5B. Under such an assumption, the plain information Ipl includes only a pair of the coordinates string information Icspl and the color information Iccpl. Here, the coordinates string information Icspl is composed of a plurality of three-dimensional coordinates for defining such an object part POdrpl by outline. The color information Iccpl defines the color to fill in the object part POdrpl.

Note that, in the above exemplary description of the plain plane Apl of FIG. 3B, the message information Ims and the plain information Ipl include the transparency information Itlm and Itlp, respectively. This is not restrictive, and a transparency flag may be an alternative possibility. If this is the case, the transparency flag in the message information Ims is set to a value, e.g., "1", to have the message plane Ams rendered opaque. In the plain information Ipl, on the other hand, the transparency flag is set to a value, e.g., 0, to have the plain plane Apl rendered translucent or transparent.

Also in the above exemplary description of the plain plane Apl of FIG. 3B, the message information Ims and the plain information Ipl include the color information Iccm and Iccp, respectively. As an alternative thereto, a texture may be included that is to be affixed to the inside of the outline defined by the coordinates string information Icsm and Icsp, respectively.

The directional object data Ddr exemplary represents a road sign in the above description of the plain plane Apl, but surely can represent any others, e.g., a billboard. In the case of representing a billboard, the message plane also shows an advertising message to the user, but the plain plane does not show an advertising message.

Figure 6A:
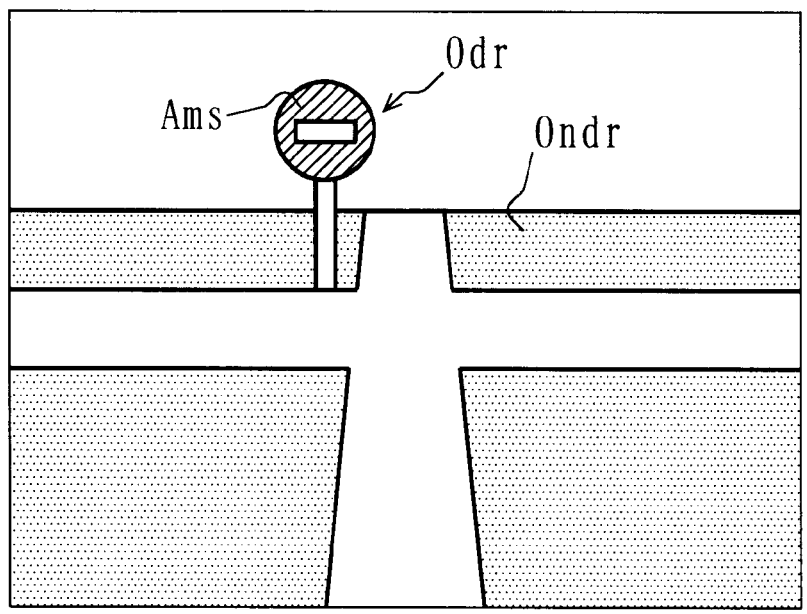
FIGS. 6A and 6B are illustrations demonstrating a non-directional object Ondr.
Figure 6B:
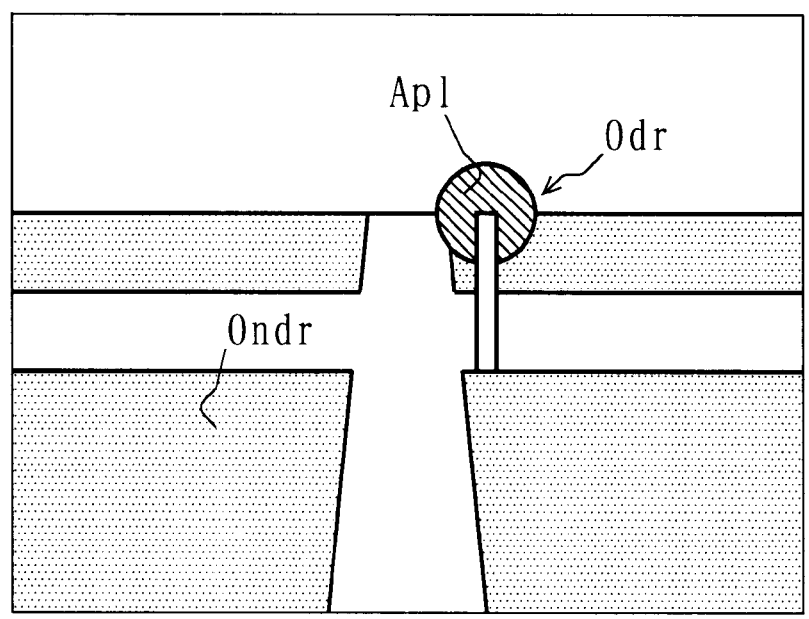

In FIG. 2, the non-directional object data Dndr represents a non-directional object Ondr. As shown in FIG. 6A, unlike the directional object Odr, the non-directional object Ondr has neither a message plane Ams nor a plain plane Apl. That is, the non-directional object Ondr does not have the directional characteristics, and the user always sees the same predetermined plane thereof regardless of where his or her current position is. FIGS. 6A and 6B both show a city block as a specific example of such a non-directional object Ondr. For a clear distinction, FIGS. 6A and 6B also show a road sign exemplified as the directional object Odr (see also FIGS. 3A and 3B). As is evident from FIGS. 6A and 6B, the user's current position decides which plane of the directional object Odr, i.e., the message plane Ams or the plain plane Apl, is perceived by the user. As to the non-directional object Ondr, however, the same predetermined plane is always perceived by the user regardless of his or her current position. Although the non-directional object Ondr varies in size and position between FIGS. 6A and 6B to be precise, the same predetermined plane remains displayed.

Figure 7:
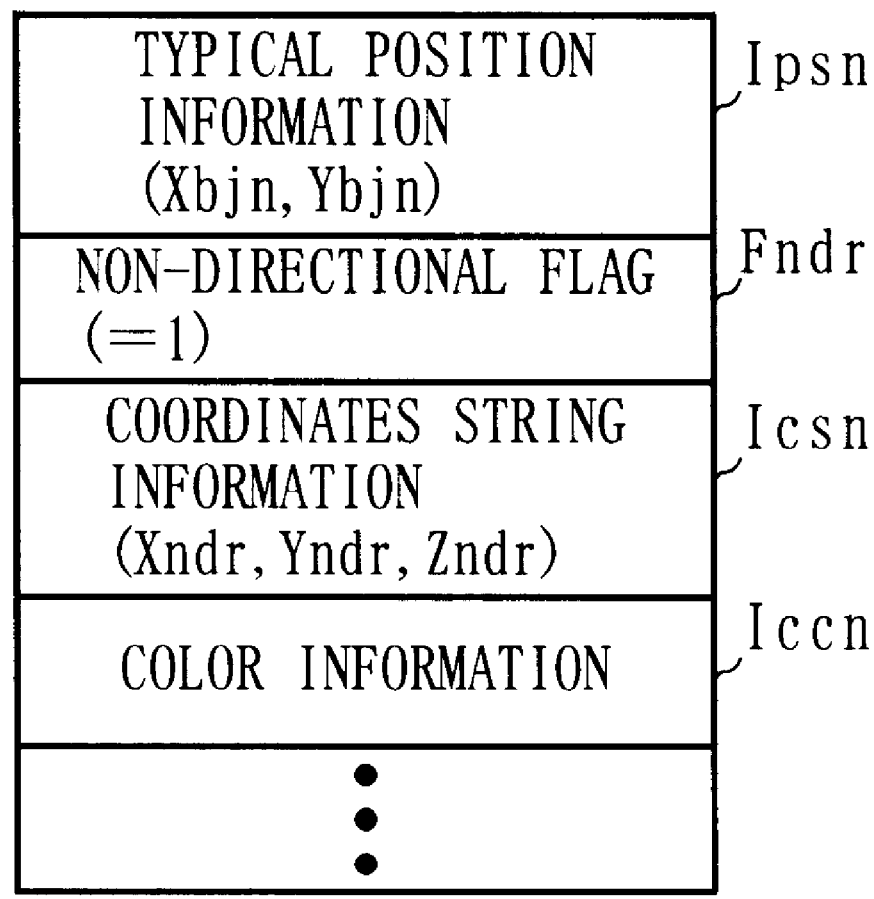
FIG. 7 is a schematic diagram showing the structure of non-directional object data Dndr representing the non-directional object Ondr shown in FIGS. 6A and 6B.

FIG. 7 shows the structure of the non-directional object data Dndr representing such a non-directional object Ondr. Referring to FIG. 7, the non-directional object data Dndr includes typical position information Ipsn, a non-directional flag Fndr, and several pairs of coordinates string information Icsn and color information Iccn.

The typical position information Ipsn defines the non-directional object Ondr by position according to where such a non-directional object typically is located. The typical position is specified normally by a set of latitude and longitude coordinates Xbjn and Ybjn, respectively.

The non-directional flag Fndr is information used for specifying the non-directional object data Dndr. In the present embodiment, the non-directional flag Fndr is assigned with a value of "1". Using such a non-directional flag Fndr, the processor 1 distinguishes the non-directional object data Dndr from the directional object data Ddr.

The pair of the coordinates string information Icsn and the color information Iccn defines the non-directional object Ondr by shape and color, as do the pairs in the directional object data Ddr. For defining by outline an object part being a structural element of the non-directional object Ondr, the coordinates string information Icsn includes a plurality of three-dimensional coordinates (Xndr, Yndr, Zndr). The coordinates string information Icsn also includes connection information corresponding as to how those three-dimensional coordinates are to be connected to one another for rendering the object part. The color information Iccn defines with what color the object part is to be filled.

Unlike the directional object data Ddr, the non-directional object data Dndr does not necessarily include information like the transparency information Itlm and Itlp and the direction information Idrm and Idrp. This is because there is no necessity for the user to see the area behind the non-directional object Ondr, and thus all the rendering device Urnd1 has to do for the non-directional object Ondr is to render it with a given transparent gradient. Accordingly, the rendering program 21 previously includes the transparent gradient for the non-directional object Ondr, preferably a value of "0". This keeps the non-directional object data Dndr from carrying unnecessary information, and consequently, the storage 4 in the navigation device Unv becomes relatively small in capacity.

In the above exemplary description of the non-directional object Ondr, the non-directional object data Dndr includes the color information Iccn. Alternatively, a texture may be included to be affixed to the inside of the outline defined by the coordinates string information Icsn. Moreover, the non-directional object data Dndr exemplary represents a city block as described above, but it surely can represent any other landmarks, e.g., road, or greenbelt.

In FIG. 2, the road network data Dnt may be of a known type, and it represents a road network using nodes and links in the specific wide range described above. The nodes each specify, by two-dimensional coordinates, i.e., a latitude coordinate and a longitude coordinate, intersections and characteristic points typified by curving points of roads on the road network. The links each specify which node is connected to which, and include information about distances between any two characteristic points and any other information which is needed.

In FIG. 1, the GPS receiver 5 receives information coming from artificial satellites assigned to the Global Positioning System (GPS). Based on the received information, the GPS receiver 5 calculates the current position of the navigation device Unv, i.e., the current position of the user. The GPS receiver 5 then generates current position information Icp indicating the resulting current position, and then forwards it to the CPU 1. The autonomous navigation sensors 6 include a gyrocompass and a vehicle speed sensor, and detects in which direction the navigation device Unv is heading and with what speed. Using the detection results, autonomous navigation information Ian is generated and forwarded to the CPU 1. The input unit 7 typically includes a remote controller and buttons. The display 8 is typically composed of a liquid crystal display.

Figure 8:
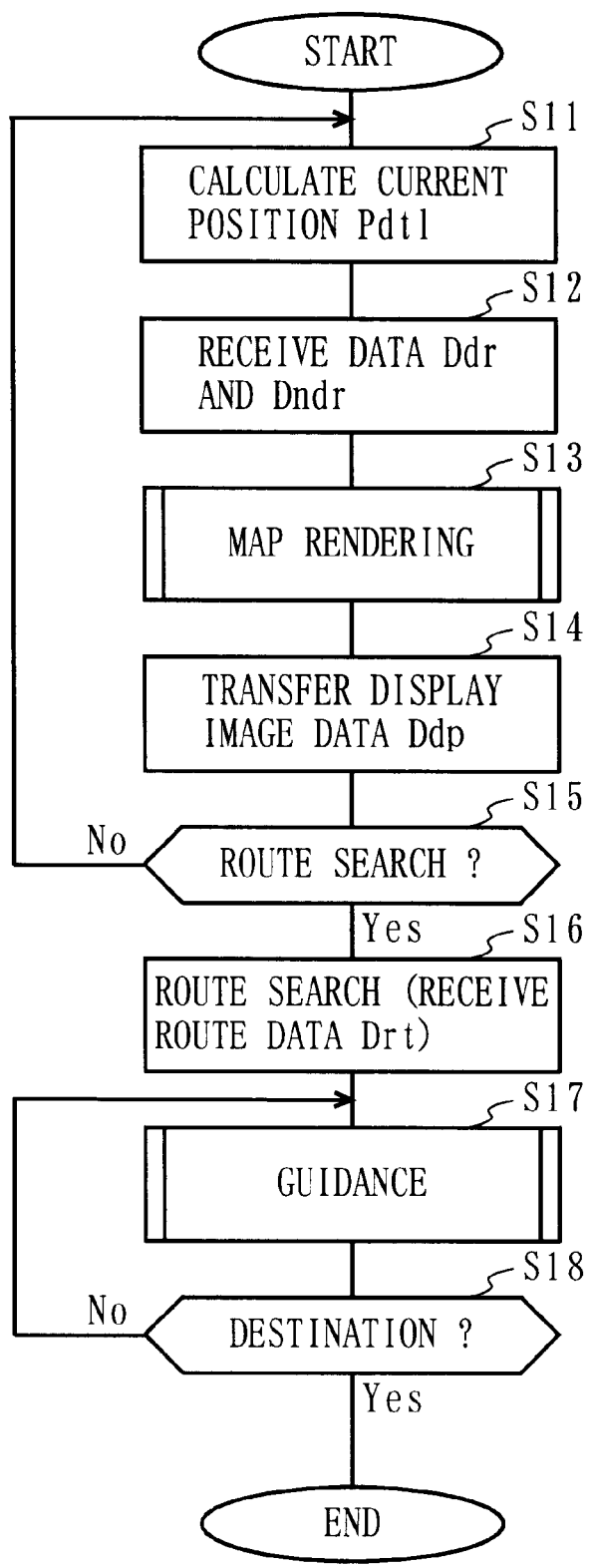
FIG. 8 is a flowchart of processes written in a navigation program 22 of FIG. 1 to be executed by a processor 1.

Described next is the operation of the navigation device Unv structured as described above. After the navigation device Unv is turned on, the processor 1 starts executing the navigation program 22 stored in the program memory 2. Here, FIG. 8 is a main flowchart of the processes written in the navigation program 22 to be executed by the processor 1 . In FIG. 8, the processor 1 receives the current position information Icp from the GPS receiver 5 and the autonomous navigation information Ian from the autonomous navigation sensors 6. Then, the processor 1 operates to calculate the specific current position Pdtl of the navigation device Unv, i.e., the current position of the user, by using the received current position information Icp and the autonomous navigation information Ian (step S11). Here, the current position Pdtl is presumably represented by (Xdtl, Ydtl), in which Xdtl denotes a latitude coordinate of the navigation device Unv, and Ydtl denotes a longitude coordinate thereof. The current position Pdtl is then stored onto the working area 3.

The processor 1 then operates to access the cartographic database DBct and forward to the working area 3 the directional object data Ddr and the non-direction object data Dndr which satisfy current conditions (step S12). More specifically, the processor 1 first calculates an area $\alpha 1$ based on the current position Pdtl. The area $\alpha 1$ is normally a rectangular region including the current position Pdtl therein, and more specifically, a region around the current position Pdtl. The area $\alpha 1$ is expediently presumed to be the map area displayed on the display 8. In step S12, the directional object data Ddr is received if the corresponding typical position information Ipsd is in the area $\alpha 1$. This is also applicable to the non-directional object data Dndr and its typical position information Ipsn.

As such, in step S12, any corresponding directional object data Ddr and non-directional object data Dndr are provided to the working area 3. Here, using a wider area than the area $\alpha 1$ for data fetch in step S12 may be a possible way to speed up generating the display image data Ddp. In this manner, the directional object data Ddr and the non-directional object data Dndr become available from the working area 3, which is accessible at a higher speed. Consequently, the processor 1 can be reduced in access frequency to the storage 4.

Figure 9:
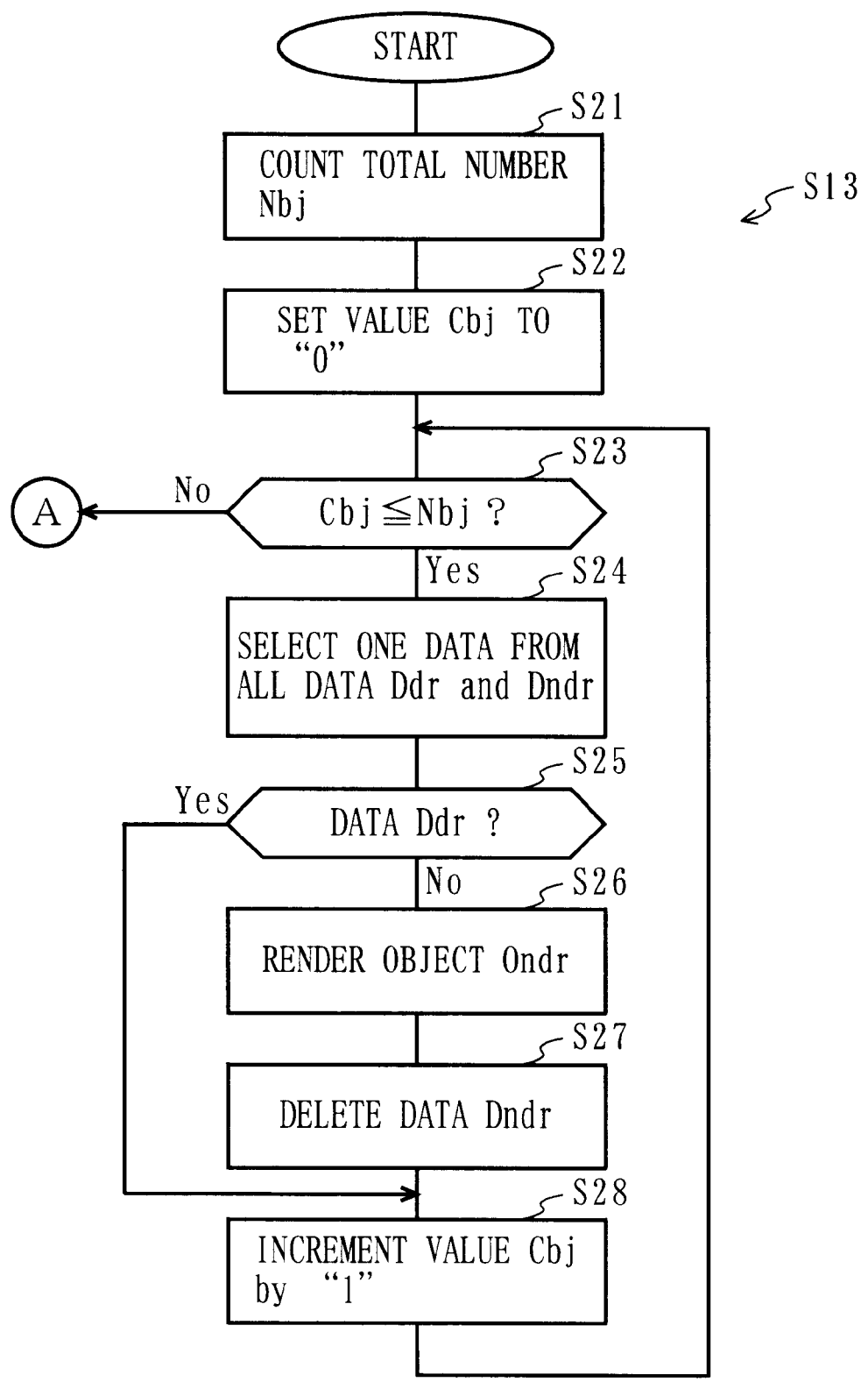
FIG. 9 is a detailed flowchart of the first half of the processes in step S13 of FIG. 8 and step S43 of FIG. 15.
Figure 10:
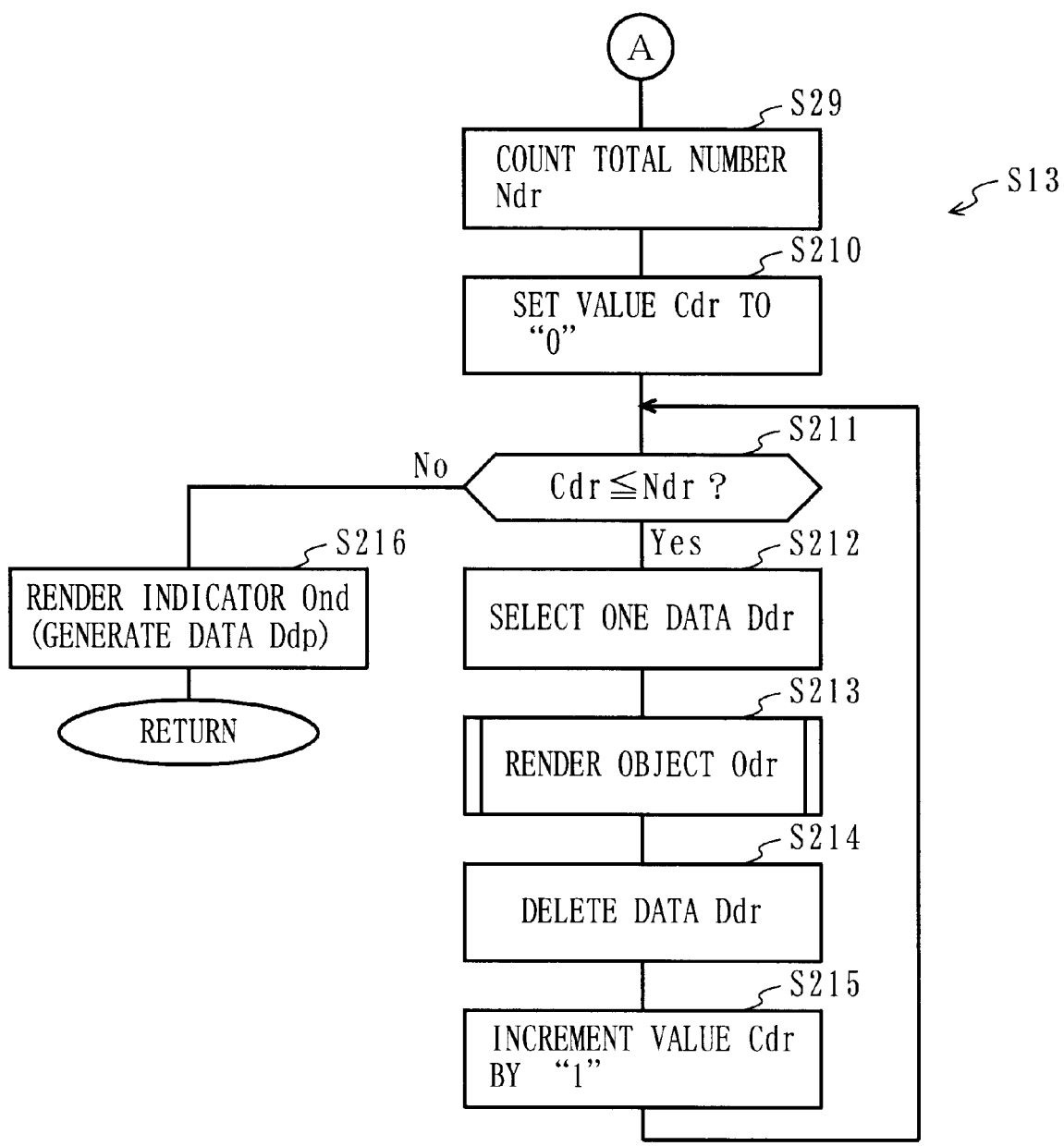
FIG. 10 is a detailed flowchart of the second half of the processes in step S13 of FIG. 8.

The processor 1 then executes the rendering program 21 stored in the program memory 2 for map rendering (step S13). More specifically, the processor 1 generates, on a frame memory (not shown) reserved in the working area 3, the display image data Ddp for display on the display 8. FIGS. 9 and 10 show the detailed procedlure of the processor 1 in step S13. Referring to FIG. 9, the processor 1 first counts the total number Nbj of the directional object data Ddr and the non-directional object data Dndr on the working area 3 (step S21), and stores the result onto the working area 3.

The processor 1 then sets the value Cbj of a counter (not shown) to an initial value "0" (step S22). In step S24, which will be described later, one data is selected from those directional object data Ddr and non-directional object data Dndr in the working area 3. Here, the counter value Cbj indicates how many of the directional object data Ddr and the non-directional object data Dndr are selected in step S24.

The processor 1 then determines whether the counter value Cbj is equal to or smaller than the total number Nbj (step S23). If Cbj≦Nbj is not satisfied, the processor 1 regards that all of the data, i.e., the directional object data Ddr and the non-directional object data Dndr, in the working area 3 have been selected, and the procedure goes to step S29 of FIG. 10 which will be described later. If Cbj≦Nbj is satisfied, on the other hand, the processor 1 regards that the working area 3 has data not yet selected, i.e., the directional object data Ddr or the non-directional object data Dndr, and the procedure goes to step S24.

In step S24, the processor 1 selects one data from the directional object data Ddr and the non-directional object data Dndr in the working area 3.

The processor 1 then determines whether the selected data is the directional object data Ddr or the non-directional object data Dndr (step S25). To be more specific, the determination factor in step S25 is the value of the flag in the selected data. If the value is "0", it means the flag is the directional flag Fdr (see FIG. 4), and thus the processor 1 determines that the currently selected data is the directional object data Ddr. If the value is "1", it means the flag is the non-directional flag Fndr (see FIG. 7), and the selected data is determined as being the non-directional object data Dndr.

In step S25 of FIG. 9, if the selected data is determined as being the directional object data Ddr, the procedure skips steps S26 ad S27, and goes to step S28 which will be described later.

Figure 12A:
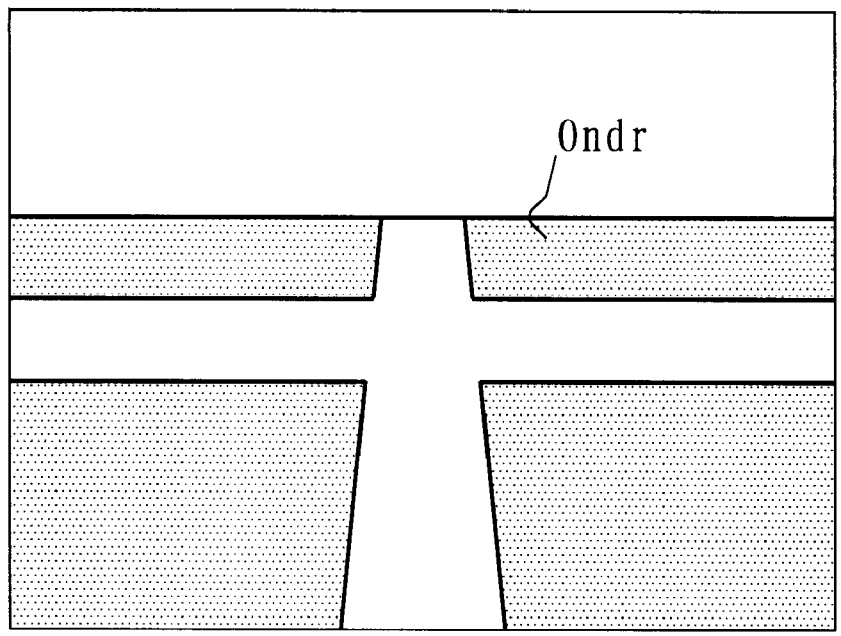
FIGS. 12A and 12B are illustrations showing, respectively, a non-directional object Ondr and others to be rendered in step S26 of FIG. 9, and a top view of the directional object Odr of FIG. 6A.

If the data selected in step S25 is the non-directional object data Dndr, on the other hand, the processor 1 applies a rendering process to the non-directional object Ondr (step S26). Although the rendering process in step S26 is similar to that which is conventionally applied, it is briefly described below. The processor 1 first extracts the coordinates stringer information Icsn and the color information Iccn from the non-directional object data Dndr which is currently selected. The processor 1 then specifies, in the frame memory, a rendering region defined by all of the three-dimensional coordinates (Xndr, Yndr, Zndr) in the extracted coordinates string information Icsn. The processor 1 then assigns the rendering region in the frame memory the color specified by the extracted color information Iccn. The processor 1 repeats this sequence of processes for every pair of the coordinates string information Icsn and the color information Iccn. As a result, a piece of non-directional object Ondr is rendered in the frame memory, and resultantly generated is intermediate image data representing the non-directional object Ondr as shown in FIG. 12A.

The processor 1 then deletes the non-directional object data Dndr from the working area 3 (FIG. 9; step S27), and increments the counter value Cbj by "1" (step S28). After step S28, the procedure returns to step S23.

By repeating steps S23 to S28, the processor 1 applies the rendering process only to the non-directional object data Dndr on the working area 3 so as to generate the intermediate image data representing only the non-directional object (s) Ondr for display on the display 8 (step S26). Accordingly, by the time when Cbj≦Nbj is not satisfied in step S23, all of the non-directional object data Dndr on the working area 3 would be subjected to the rendering process. The resulting intermediate image data at this time represents all of the non-directional object(s) Ondr belonging to the area α1. Also, at the point in time when Cbj≦Nbj is not satisfied, all of the non-directional object data Dndr are deleted from the working area 3, and thus left thereon are only the directional object data Ddr selected in step S12.

When Cbj≦Nbj is determined as not satisfied in step S23, the processor 1 counts the total number Ndr of the directional object data Ddr in the working area 3 (FIG. 10; step S29), and stores the result onto the working area 3. The processor 1 then sets the value Cdr of a counter (not shown) to an initial value "0" (step S210). Here, the counter value Cdr indicates how many of the directional object data Ddr are selected in step S212, which will be described later.

The processor 1 then determines whether the counter value Cdr is equal to the total number Ndr or smaller (step S211). If Cdr≦Ndr is not satisfied, the processor 1 regards that all of the directional object data Ddr in the working area 3 have been selected in step S212, and the procedure goes to step S216 which will be described later. If Cdr≦Ndr is satisfied, the processor 1 regards that the working area 3 has the directional object data Ddr which is not yet selected, and the procedure goes to step S212.

The processor 1 then selects one directional object data Ddr from the working area 3 (step S212), and applies the rendering process to the corresponding directional object Odr, (step S213).

Figure 11:
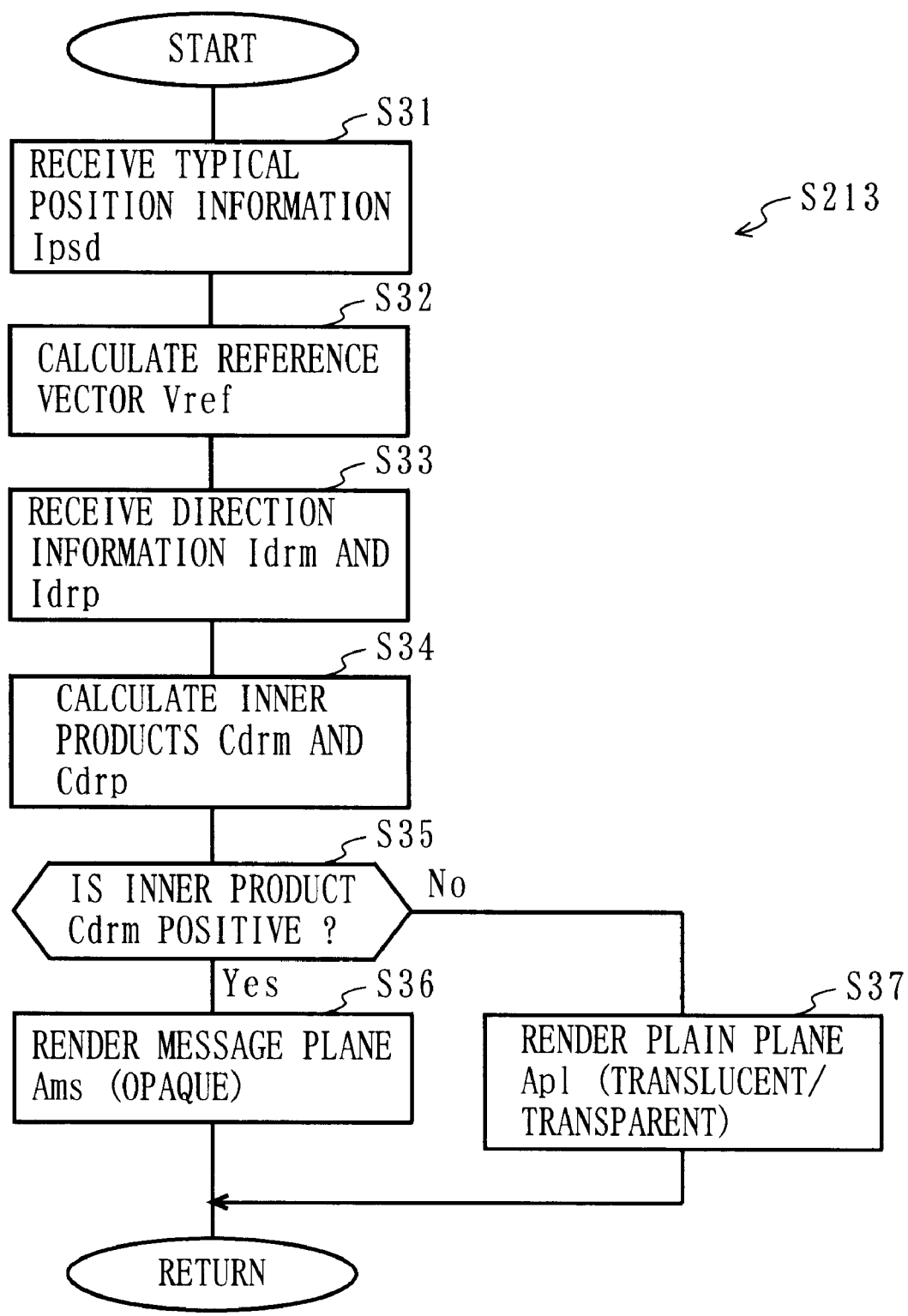
FIG. 11 is a detailed flowchart of step S213 of FIG. 10.

Here, FIG. 11 is a detailed procedure flowchart of the rendering process applied by the processor 1 to the directional object data Ddr. Prior to step S36, the current position Pdtl (Xdtl, Ydtl) calculated in step S11 is stored in the working area 3. In FIG. 11, the processor 1 analyzes the positional relationship between the user and the directional object Odr. The processor 1 first operates to receive the typical position information Ipsd from the directional object data Ddr selected in step S212 (step S31). As shown in FIG. 4, the typical position information Ipsd is represented by the two-dimensional coordinates (Xbjd, Ybjd).

The processor 1 then operates to calculate, based on the typical position information Ipsd received above, a reference vector Vref (Xref, Yref) which defines in which direction the directional object Odr is facing with respect to the current position Pdtl of the navigation device Unv (FIG. 11; step S32). Here, Xrefr=Xbjd−Xdtl, and Yref=Ybjd−Ydtl. This reference vector Vref is stored in the working area 3.

The processor 1 then operates to receive the direction information Idrm and Idrp from the selected directional object data Ddr (step S33). As described by referring to FIG. 4, the direction information Idrm is a vector (Xdrm, Ydrm) indicating in which direction the message plane Ams is facing. The direction information Idrp is a vector (Xdrp, Ydrp) indicating, in which direction the plain plane Apl is facing.

Figure 12B:
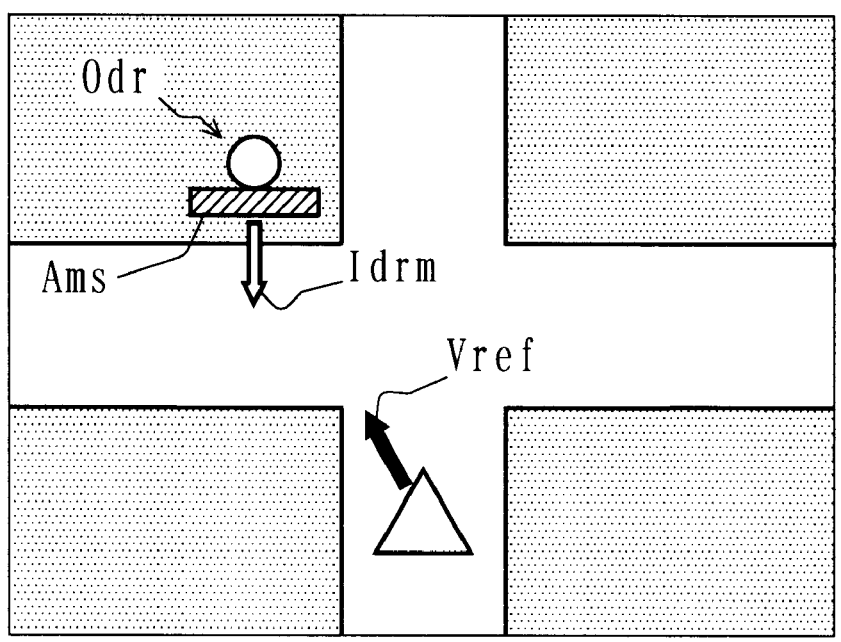

The processor 1 then operates to calculate an inner product Cdrm of the reference vector Vref and the direction information Idrm, and also calculate an inner product Cdrp of the reference vector Vref and the direction information Idrp (FIG. 11; step S34). Here, as already described referring to FIG. 4, Xdrp=−Xdrm, and Ydrp=−Ydrm. Thus, if the inner product Cdrp is positive in value, the inner product Cdrm is negative in value, and vice versa. After step S34, the processor 1 determines whether the calculated inner product Cdrm is positive or not (step S35). Referring now to FIG. 12B, which shows a top view of the directional object Odr of FIG. 6A, if the inner product Cdrm is determined as being positive in step S35, the direction information Idrm (see hollow arrow) and the reference vector Vref(see black arrow) are opposite in direction to each other as shown in FIG. 12B. This will lead to a conclusion that the user's current position Pdtl is in such a position, as indicated by Δ in the drawing, that the message plane Ams of the directional object Odr is perceivable therefrom. In such a case, the processor 1 executes a process so as to start rendering the message plane Ams of the directional object Odr (step S36).

Figure 13A:
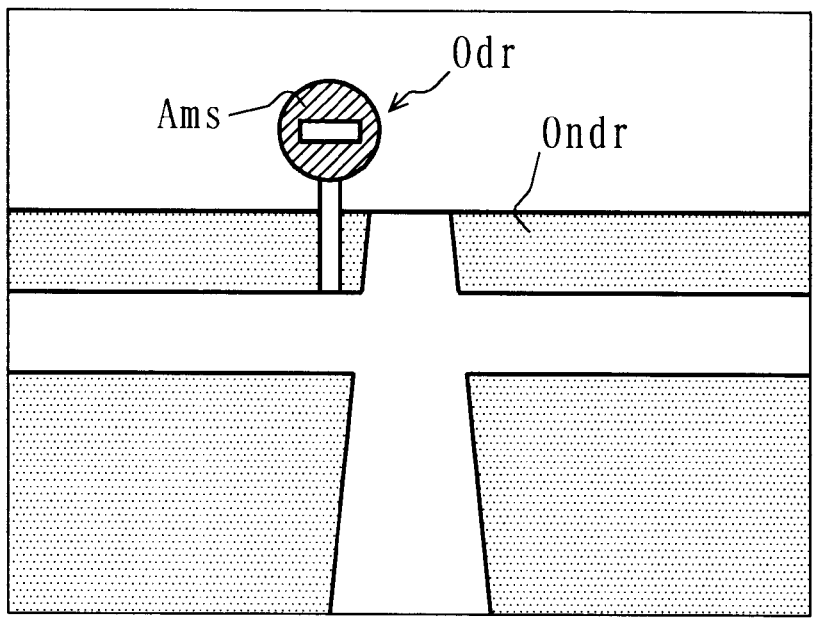
FIGS. 13A and 13B are illustrations showing, respectively, a message plane Ams to be rendered in step S36 of FIG. 11, and a top view of the directional object Odr of FIG. 6B.

In step S36, the processor 1 first extracts the transparency information Itlm from the message information Ims of the currently selected directional object data Ddr. Then, the processor 1 extracts a pair of the coordinates string information Icsm and the color information Iccm. The processor 1 then specifies, in the frame memory, a rendering region defined by all of the three-dimensional coordinates (Xpm, Ypm, Zpm) in the extracted coordinates string information Icsm. The processor 1 next assigns the rendering region the color specified by the extracted color information Iccm. Here, in the present embodiment, the transparent gradient indicated by the transparency information Itlm is "0". According to such transparency information Itlm, the processor 1 assigns the color information Iccm as it is to the rendering region, whereby a piece of object part POdrm being a part of the message plane Ams is rendered opaque. The processor 1 repeats this sequence of processes for every pair of the coordinates string information Icsm and the color information Iccm. As a result, the message plane Ams of the directional object Odr is rendered in the frame memory, and consequently generated is intermediate image data as shown in FIG. 13A representing the directional object Odr rendered opaque on the non-directional object Ondr of FIG. 12A. Note here that, because the transparency information Itlm in the message information Ims has the transparent gradient of "0", with the resulting intermediate image data, the message plane Ams clearly conveys the message to the user.

Figure 13B:
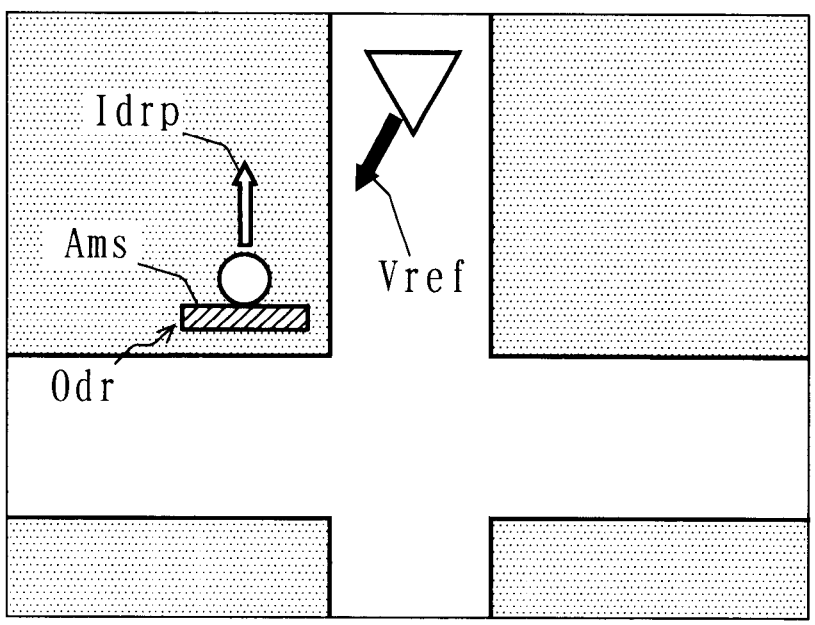

Here, FIG. 13B shows a top view of the directional object Odr of FIG. 6B. In the case where the inner product Cdrm of the reference vector Vref is determined in step S35 as being negative, that means the inner product Cdrp is positive. The direction information Idrp (see hollow arrow) and the reference vector Vref (see black arrow) are thus regarded as being opposite in direction to each other. This will lead to a conclusion that the user's current position Pdtl is in such a position, as indicated by Δ in the drawing, that the plain plane Apl of the directional object Odr is perceivable therefrom. In such a case, the processor 1 operates so as to start rendering the plain plane Apl of the directional object Odr (step S37).

In step S37, the processor 1 extracts the transparency information Itlp from the plain information Ipl in the currently selected directional object data Ddr. The processor 1 then extracts a pair of the coordinates string information Icsp and the color information Iccp. Next, the processor 1 specifies, in the frame memory, a rendering region defined by all of the three-dimensional coordinates (Xdrp, Ydrp, Zdrp) in the extracted coordinates string information Icsp. Here, there may be a case where a thus defined rendering region in the frame memory already includes any other rendered non-directional objects Ondr or directional objects Odr. Moreover, the transparency information Itlp is not indicating the transparent gradient of "0" so that the plain plane Apl needs to be rendered transparent or translucent. Accordingly, in such a case, the processor 1 blends the color previously assigned to the rendering region and the color specified by the currently extracted color information Iccp. With such blending, the processor 1 assigns the resulting new color to the rendering region. In this manner, a piece of object part Odrp being a part of the plain plane Apl is rendered transparent or translucent.

Figure 14A:
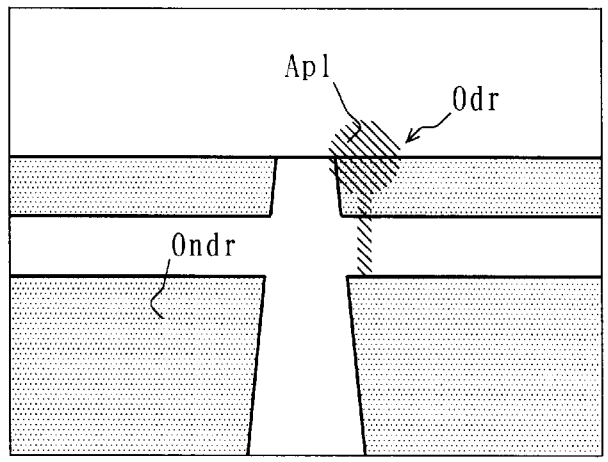
FIG. 14A is an illustration showing a plain plane Apl to be rendered in step S37 of FIG. 11, and FIGS. 14B and 14C are both illustrations showing a map represented by intermediate image data, together with an indicator Ond rendered at a current position Ptdl on the map.

The processor 1 repeats this sequence of processes for every pair of the coordinates string information Icsp and the color information Iccp. As a result, the plain plane Apl of the directional object Odr is rendered in the frame memory, and consequently generated is intermediate image data as shown in FIG. 14A representing the plain plane Apl of the directional object Odr rendered transparent or translucent on the non-directional object Ondr of FIG. 12A. Note here that, because the transparency information Itlp in the plain information Ipl has the transparent gradient of not "0", with the resulting intermediate image data, the plain plane Apl hides nothing therebehind to the user.

When either step S36 or step S37 in FIG. 11 is carried out, the procedure goes to step S214 of FIG. 10. The processor 1 deletes the directional object data Ddr theretofore received with the processes from the working area 3 (step S214), and then increments the counter value Cdr by "1" (step S215). After step S215, the procedure returns to Step) S211.

By repeating steps S211 to S215, the processor 1 applies the rendering process to the directional object data Ddr on the working area 3, and as a result, generates intermediate image data representing the non-directional object Ondr having the message plane Ails or the plain plane Apl merged thereon (FIG. 11; step S36 or S37). Accordingly, by the time when Cdr≦Ndr is not satisfied in step S211, all of the directional object data Ddr belonging to the area α1 would be rendered in the frame memory. The resulting intermediate image data at this time represents all of the non-directional objects Ondr and the directional objects Odr. As is evident from the above description of the repetition of steps S211 to S225, the intermediate image data represents a map to be displayed on the display 8. Also, at the point in time when Cdr≦Ndr is not satisfied, all of the directional object data Ddr are deleted from the working area 3.

Figure 14B:
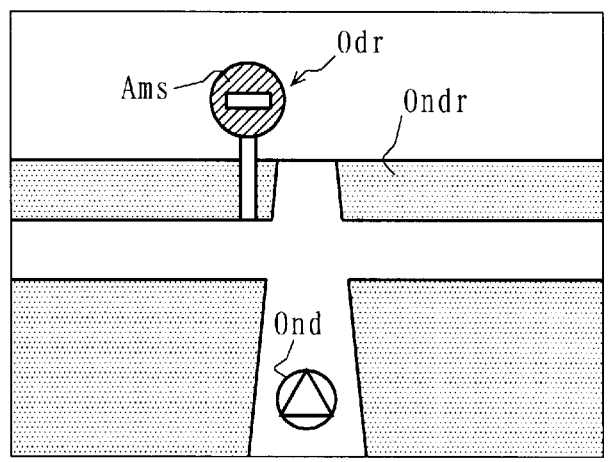
Figure 14C:
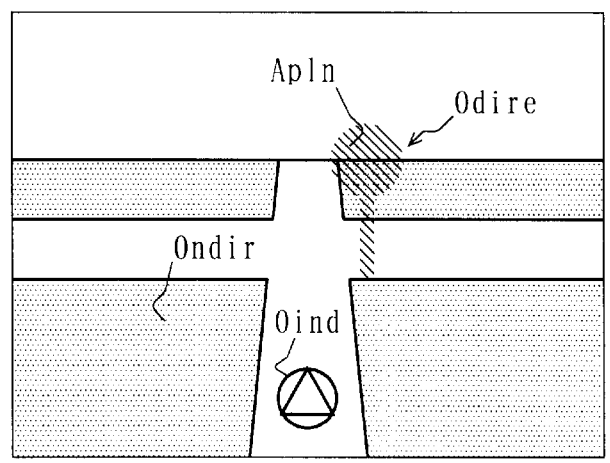

If Cdr≦Ndr is not satisfied in step S211, as shown in FIGS. 14B and 14C, the processor 1 renders an indicator Ond on the map represented by the intermediate image data to indicate the current position Ptdl thereby (FIG. 10, step S216). Here, the indicator Ond is stored in the storage 4 in advance. After step S216, the frame memory would carry display image data Ddp representing the resulting three-dimensional map including the indicator Ond. After step S216, the procedure goes to step S14 of FIG. 8. The processor 1 transfers the display image data Ddp on the frame memory to the display 8 (step S14). The display 8 goes through a display process in accordance with the received display image data Ddp, and displays on its screen the three-dimensional map of FIGS. 14B and 14C including the indicator Ond.

After step S14, the processor 1 determines whether or not to perform a route search (step S15). Step S15 is typically carried Out as follows. A predetermined part of the input unit 7 (see FIG. 1) is assigned with a function of starting a route search. If the user operates the part, the input unit 7 generates an instruction signal Sst, and transmits it to the processor 1 for instruction of the route search.

Prior to step S15, if the processor 1 has not yet received the instruction signal Sst from the input unit 7, the procedure returns to step S11 to generate the display image data Ddp. If having received the instruction signal Sst from the input unit 7, the processor 1 accordingly performs a route search (step S16). The route search is performed in a known manner, and will be briefly described below. The processor 1 searches for a route considered optimal from the user's starting point to the destination typically based on Dijkstra's algorithm. During the route search, the road network data Dnt described referring to FIG. 2 is used. Through such a route search, the processor 1 generates route data Drt representing a thus found optimal route on the working area 3. Here, the route data Drt is typically composed of node strings structuring the road network data Dnt. As already described, the nodes each specify the characteristic points on the road network by a pair of latitude and longitude coordinate values.

After deriving the route data Drt in step S16, the processor 1 goes through a guidance process (step S17) to generate the guidance image data Dgd for guiding, the user to the destination.

Here, FIG. 15 is a detailed flowchart of the processes to be executed by the processor 1 for guiding the user to the destination. In FIG. 15, the processor 1 goes through the processes similar to that in step S11 (see FIG. 8), and calculates the user's specific current position Pdtl (Xdtl, Ydtl) (step S41). The processor 1 then goes through the processes similar to that in step S12, and from the cartographic database DBct to the working area 3, fetches the directional object data Ddr and the non-directional object data Dndr whose typical position information Ipsd and Ipsn are included in the area α1 (step S42). The result is then stored onto the working area 3.

Figure 16:
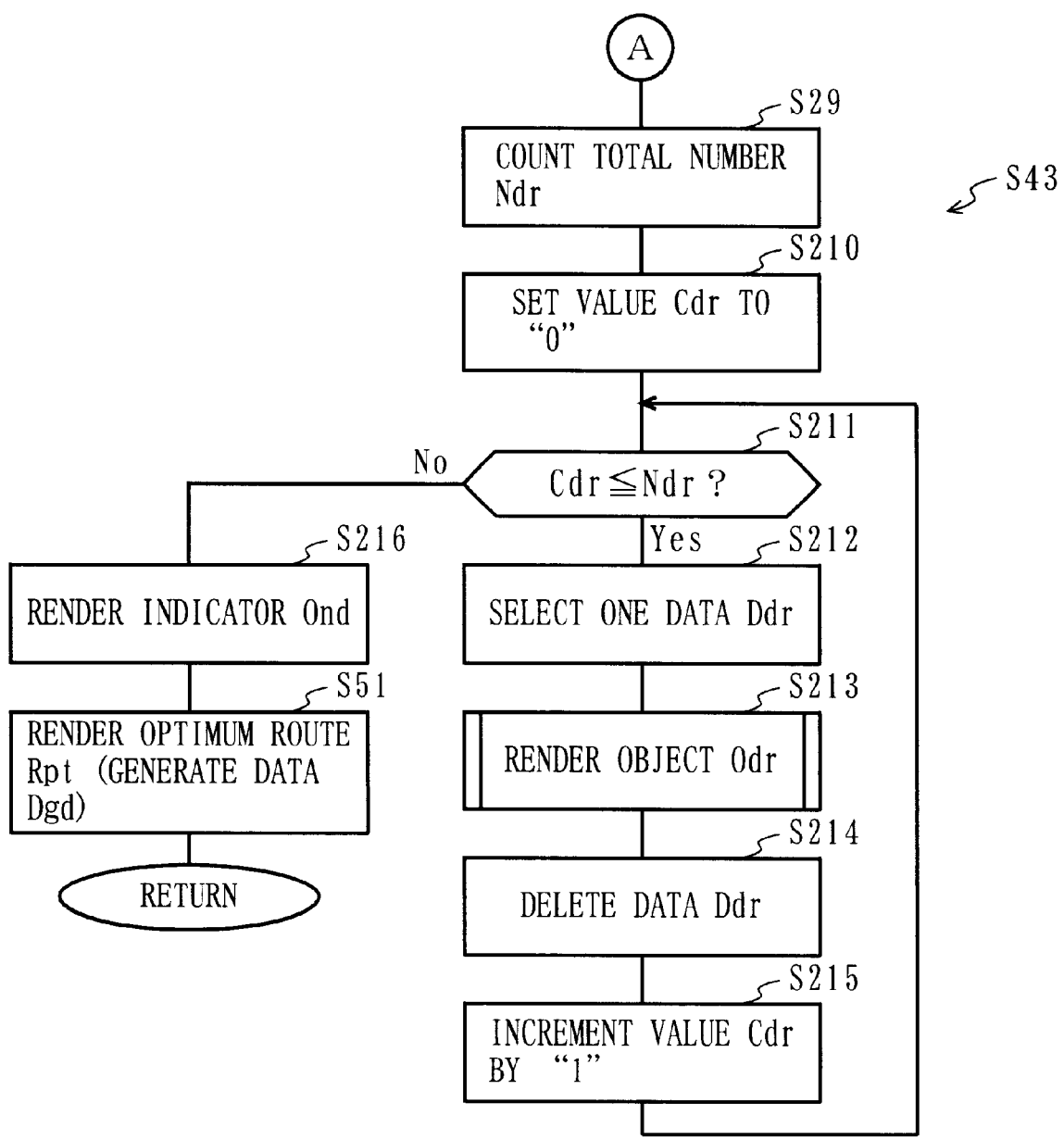
FIG. 16 is a detailed flowchart of the second half of the processes in step S43 of FIG. 15.

The processor 1 then executes the rendering program 21 stored in the program memory 2, and renders a guidance map (step S43). In more detail, the processor 1 generates, on the frame memory (not shown) reserved in the working area 3 the guidance image data Dgd for display on the display 8. FIG. 16 is the flowchart of the second half of the detailed procedure for the processor 1 applying a process to render the guidance map. The first half of the rendering process is the same as that shown in FIG. 9, so that FIG. 9 is referred to below. On comparison with the flowchart of FIG. 10, the flowchart of FIG. 16 further includes step S51 after step S216. This is the only difference therebetween, and thus in FIG. 16, any step identical to that of FIG. 10 is provided with the same step number and not described again.

In FIGS. 9 and 16, by the time when step S216 is carried out, the frame memory would have intermediate image data similar to the display image data Ddp as above. As already described, the working area 3 stores the route data Drt. After step S216, the processor 1 renders the optimal route Rpt on the three-dimensional map (step S51). In step S51, the processor 1 extracts any nodes in the area α1 from the node strings of the route data Drt. The processor 1 then connects thus extracted nodes on the frame memory by a predetermined line so as to render the optimal route Rpt. By the time when step S51 is carried out, the frame memory would store the guidance image data Dgd representing the map including the optimal route Rpt and the indicator Ond.

Figure 17A:
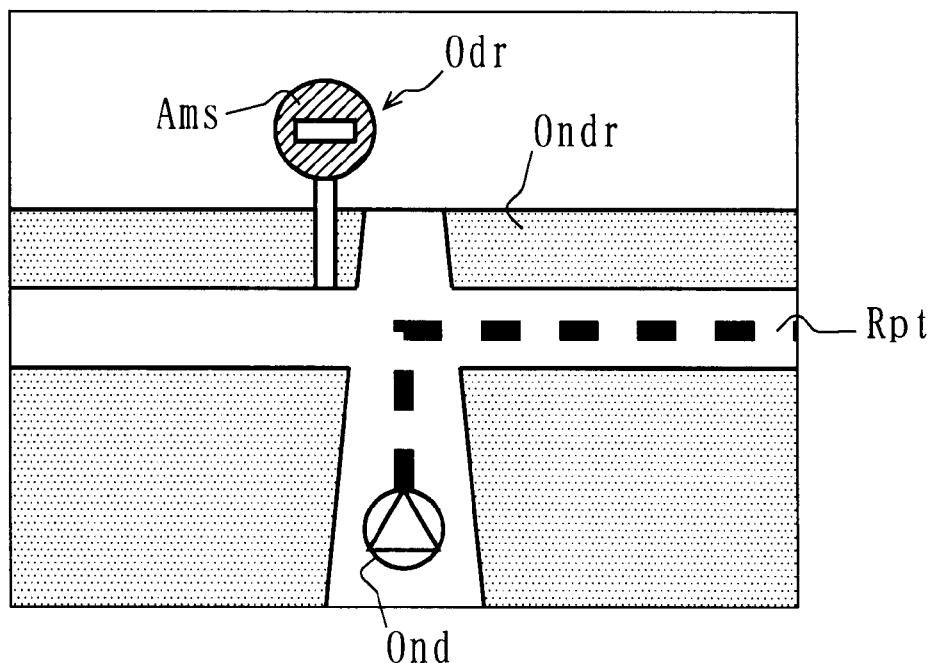
FIGS. 17A and 17B are illustrations showing an optimal route Rpt to be rendered in step S51 of FIG. 16.
Figure 17B:
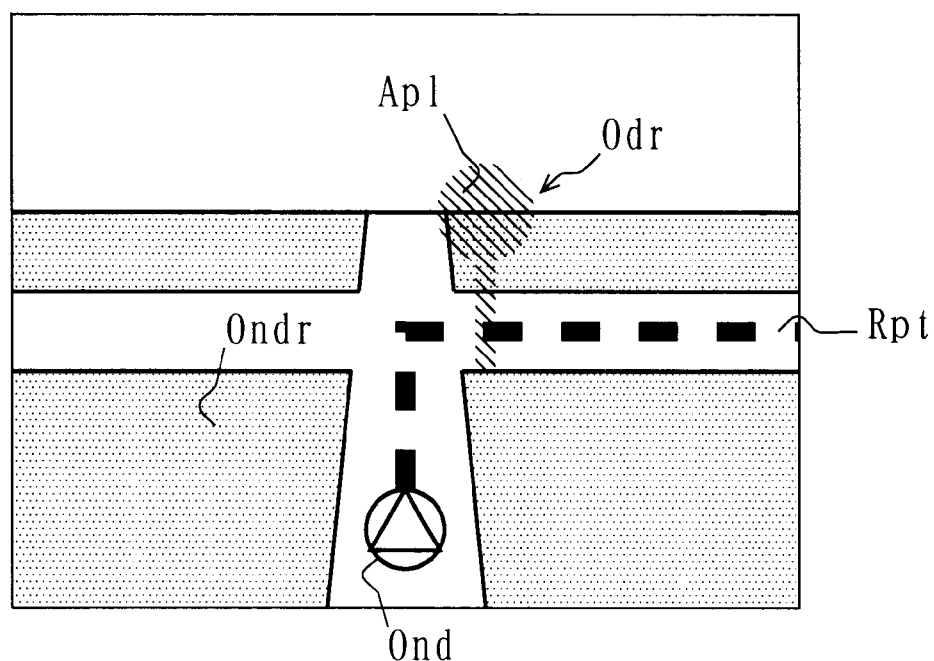

After step S51, the procedure goes to step S44 of FIG. 15. The processor 1 transfers the guidance image data Dgd on the frame memory to the display 8 (step S44). The display 8 then goes through the display process in accordance with the received guidance image data Dgd, and displays on its screen the map as shown in FIGS. 17A and 17B including the optimal route Rpt and the indicator Ond to guide the user to the destination.

After step S44, the procedure Does to step S18 of FIG. 8. The processor 1 determines whether or not the current position Pdtl calculated in step S41 coincides with the latitude and longitude coordinates of the destination (step S18). If not coincided, the processor 1 regards that the guidance to the user's destination is not yet completed, and thus the procedure returns to step S17 to newly generate the display image data Dgd. On the other hand, if the current position Pdtl calculated in step S41 coincides with the coordinates of the destination in step S18, the processor 1 regards that the guidance to the user's destination is now completed, and this is the end of the procedure of FIG. 8.

As such, the rendering device Urnd1 of the present embodiment receives the directional object data Ddr from the storage 4, and renders the corresponding directional object Odr. For object rendering, i.e., in steps S31 to S37 (see FIG. 11), the processor 1 calculates the inner products Cdrm and Cdrp based on the user's current position Pdtl (step S34). These inner products Cdrm and Cdrp are used to see the positional relationship between the current position Pdtl and the directional object Odr, and the processor 1 then determines which of the message plane Ams or the plain plane Apl to render.

As described above, the message plane Ams has to visually convey the message clearly to the user. Thus, the processor 1 renders the message plane Ams opaque as shown in FIGS. 1–3A in accordance with the transparent gradient of "0" in the transparency information Itlm (step S36). As to the plain plane Apl carrying no message, the processor 1 renders it transparent or translucent as shown in FIG. 14A in accordance with the value not "0" in the transparency information Itlp (step S37). This makes the plain plane Apl see-through, and thus the user can see the area therebehind on the displayed map on the display 8. As such, depending, on the user's current position Pdtl, the rendering device Urnd1 can change the manner of rendering the directional objects Ddr so that the resulting three-dimensional map can be driver friendly.

As described above, the rendering device Urnd1 renders the message plane Ams opaque and the plain plane Apl transparent or translucent for rendering those each in a different manner. Alternatively, the rendering device Urnd1 may render any plain including the directional object data Ddr opaque and other regions by wireframes. Such a technique is preferably applied to the directional object data Ddr representing constructions typified by buildings.

Figure 18A:
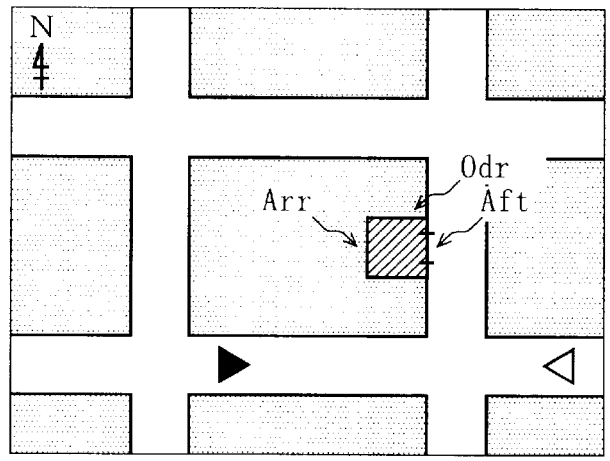
FIGS. 18A to 18C are illustrations demonstrating another example of the directional object Odr.
Figure 18B:
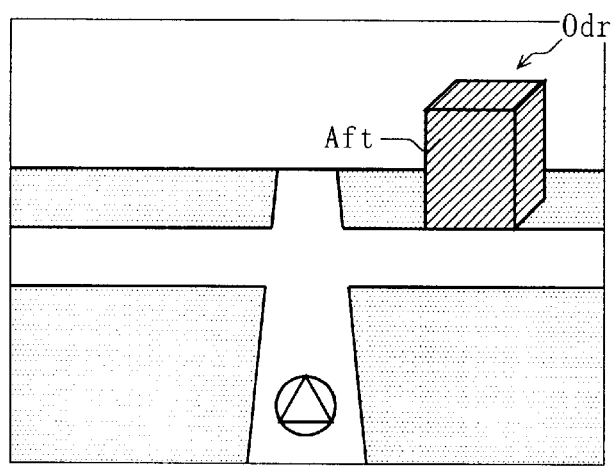
Figure 18C:
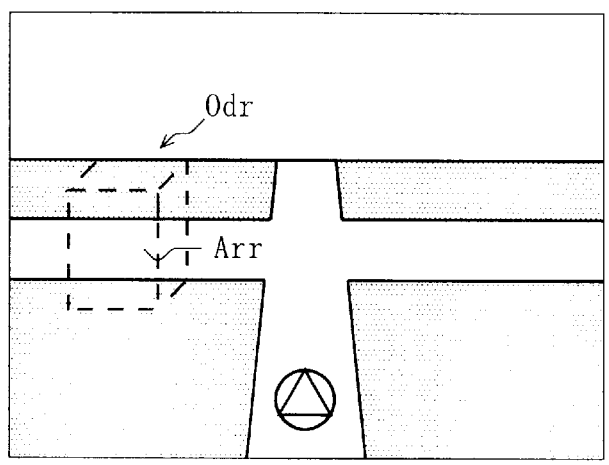

Here, FIGS. 18A to 18C show a building as another exemplary directional object Odr. In FIG. 18A, the building as the directional object Ddr has an entrance/exit on the east side thereof facing the road. On the west side thereof, although not shown, there is another building and thus the corresponding plane of the building has no entrance/exit. Herein, the plane of the directional object Odr having the entrance/exit is referred to as a from plane Aft, and the plane having no entrance/exit as a rear plane Arr. In this example, if the user's current position is opposite in direction to the front plane Aft of the directional object Odr, i.e., the user's current position is in such a position as indicated by Δ in the drawing, the rendering device Urnd1 renders the building as the directional object Odr opaque as shown in FIG. 18B similarly to step S36. On the other hand, if the user's current position is opposite in direction to the rear plane Arr of the directional object Odr, i.e., the user↓s current position in Such a position as indicated by Δ in FIG. 18A, the rendering device Urnd1 simply outlines the directional object Odr by a predetermined line instead of performing step S37. That is, the rendering device Urnd1 renders the directional object Odr only by wireframes as shown in FIG. 18C.

Described next is a rendering device Urnd2 according to a second embodiment of the present invention. The rendering device Urnd2 is identical in hardware structure to the rendering device Urnd1. Thus, FIG. 1 is referred to below, and in the second rendering device Urnd2, any component identical to that of the rendering device Urnd1 is not described again. Note that the rendering program 21 is partially different from that in the first embodiment, including some additional steps.

Such a rendering device Urnd2 is incorporated into the navigation device Unv of the first embodiment. The data stored in the storage 4 is the same between the rendering devices Urnd1 and Urnd2. Thus, FIG. 2 is referred to below, and in the storage 4 of the rendering device Urnd2, any data identical to that stored in the storage 4 of the rendering device Urnd1 is provided with the same reference numeral and is not described below.

Figure 19:
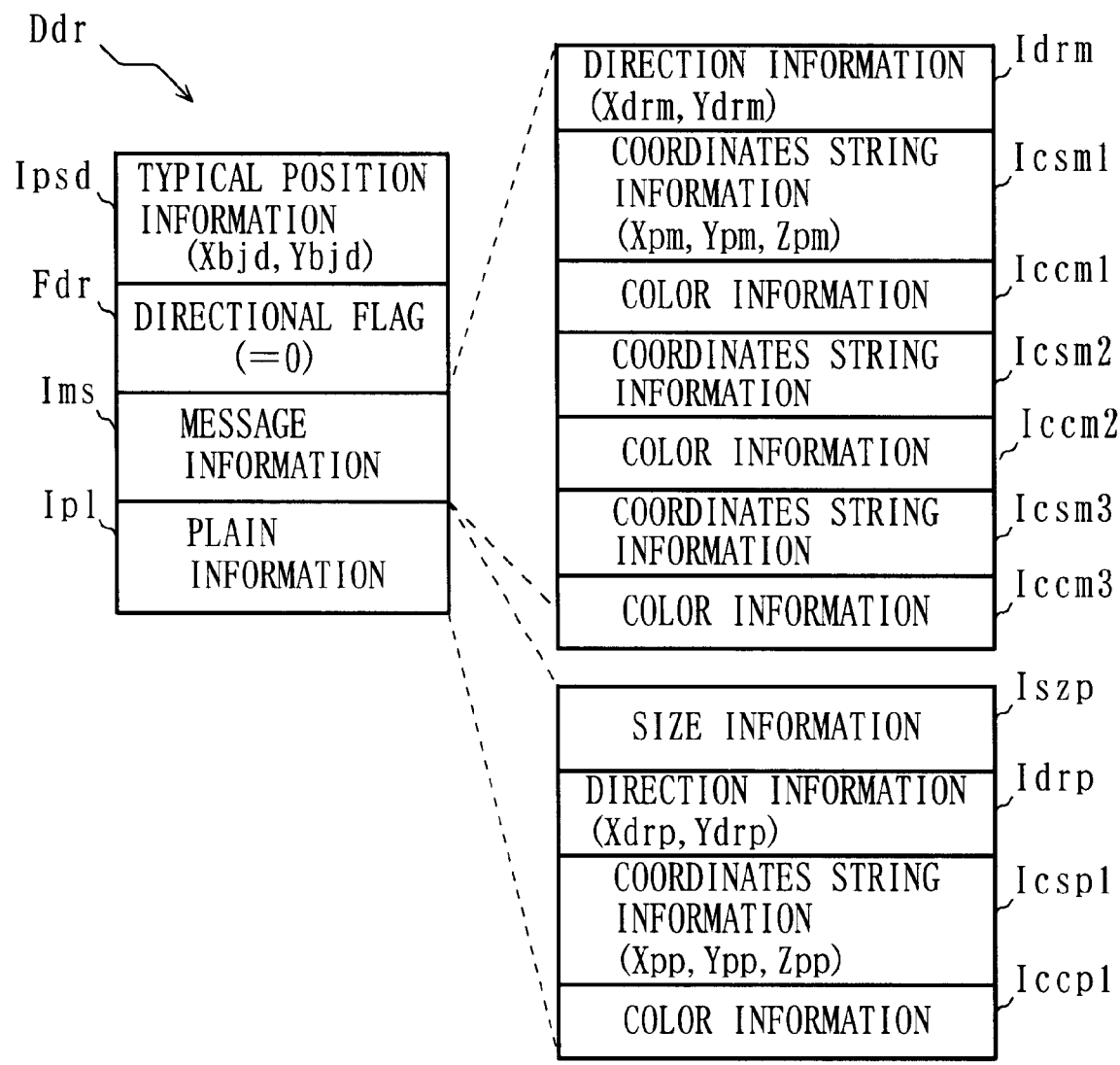
FIG. 19 is a schematic diagram showing another exemplary structure of the directional object data Ddr representing the directional object Odr shown in FIGS. 3A and 3B.

Compared with the first embodiment, the directional object data Ddr in the storage 4 of the second embodiment does not include the transparency information Itlm, and instead of the transparency information Itlp, includes size information Iszp. This is the only difference therebetween, and thus in FIG. 19, any information identical to that of FIG. 4 is provided with the same reference numeral and is not described again. The size information Iszp indicates the size of the directional object Odr in the case of renderings the plain plane Apl. As already mentioned, the message plane Ams needs to clearly convey the message to the users, and the users often prefer seeing the area behind the directional object Odr rather than seeing the plain plane Apl. Therefore, the size information Iszp is previously set to such a value as making the plain plane Apl rendered smaller than the message plane Ams. More preferably, set to the size information Iszp is the scaling factor of the plain plane Apl to the message plane Ams. This elimimiates the necessity for information in the directional object data Ddr to indicate the size of the message plane Ams, whereby the capacity of the storage 4 can be effectively used, Here, the data structure of FIG. 19 is not restrictive, and the directional object data Ddr may further include size information for the message plane Ams.

Figure 20:
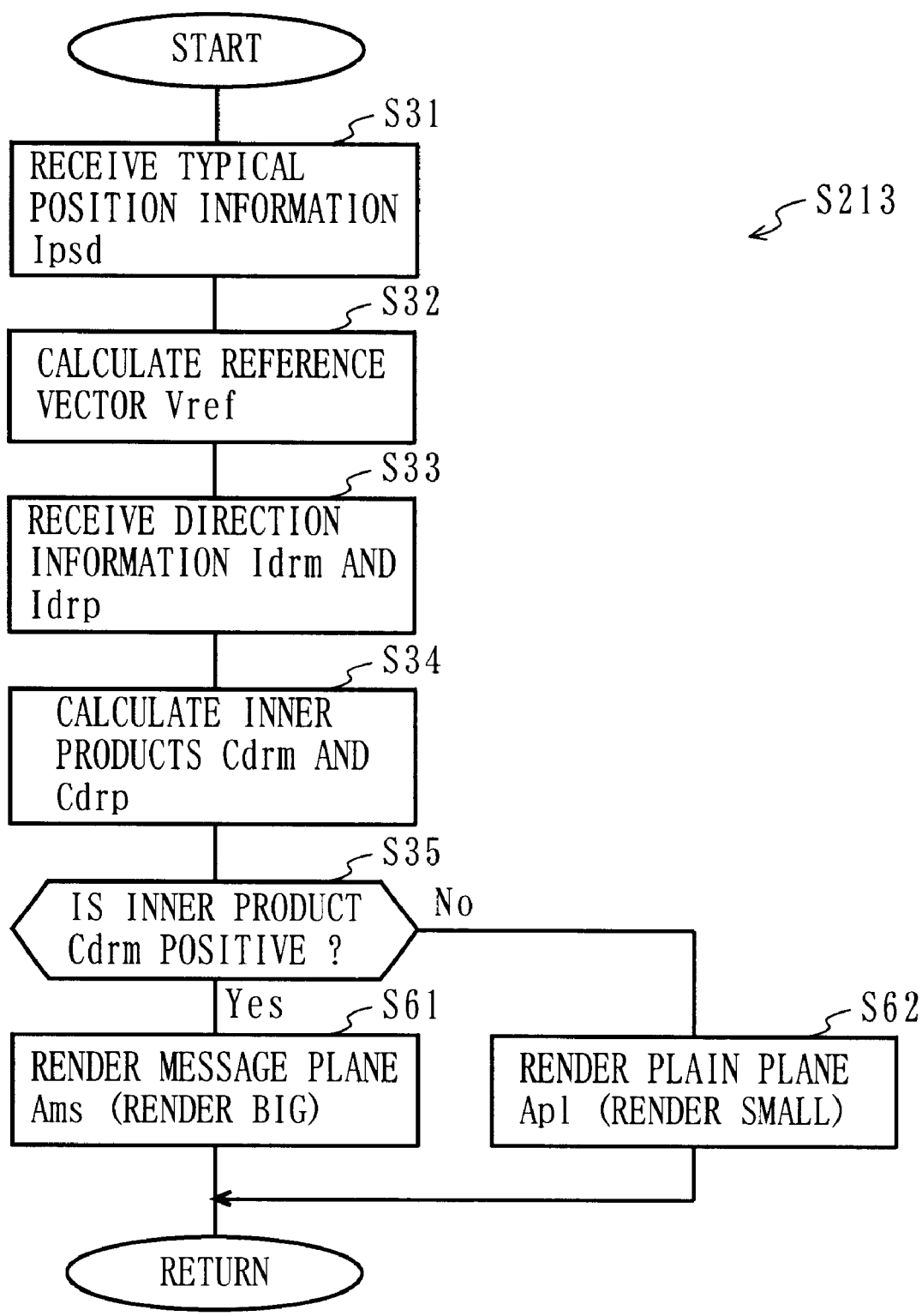
FIG. 20 is another detailed flowchart of step S213 of FIG. 10.

Described next is the operation of the navigation device Unv structured as above. On comparison with the processes of the first embodiment (FIGS. 8 to 11, 15, and 16), the navigation device Unv of the second embodiment carries out steps S61 and S62 of FIG. 20 as alternatives to steps S36 and S37 of FIG. 11. This is the only difference therebetween, and thus FIGS. 8 to 10, 15, and 16 are referred to in the below, and any step identical to that in the first embodiment is not described again. In FIG. 20, if the inner product Cdrm is positive in value in step S35, the processor 1 executes a process which starts rendering the message plane Ams of the directional object Odr (step S61).

In step S61, the processor 1 first extracts a pair of the coordinates string information Icsm and the color information Iccm from the message information Ims in the currently selected directional object data Ddr. Then, the processor 1 specifies in the frame memory, a rendering region defined by all of the three-dimensional coordinates (Xpm, Ypm, Zpm) in the extracted coordinates string information Icsm. The processor 1 then assigns the rendering, region the color specified by the extracted color information Iccm. In this manner, a piece of object part Podrm being a part of the message plane Ams is rendered. The processor 1 repeats this sequence of processes for every pair of the coordinates string information Icsm and the color information Iccm. As a result, the message plane Ams of the directional object Odr is rendered in the frame memory, and resultantly generated is intermediate image data representing the directional object Odr as shown in FIG. 13A. Here, in step S61, if the message information Ims includes information indicating, the size of the message plane Ams, the processor 1 may adjust the size of the message plane Ams based thereon.

On the other hand, if the inner product Cdrm is determined as being negative in step S35, the processor 1 operates so as to start rendering the plain plane Apl of the directional object Odr (step S62).

Figure 21:
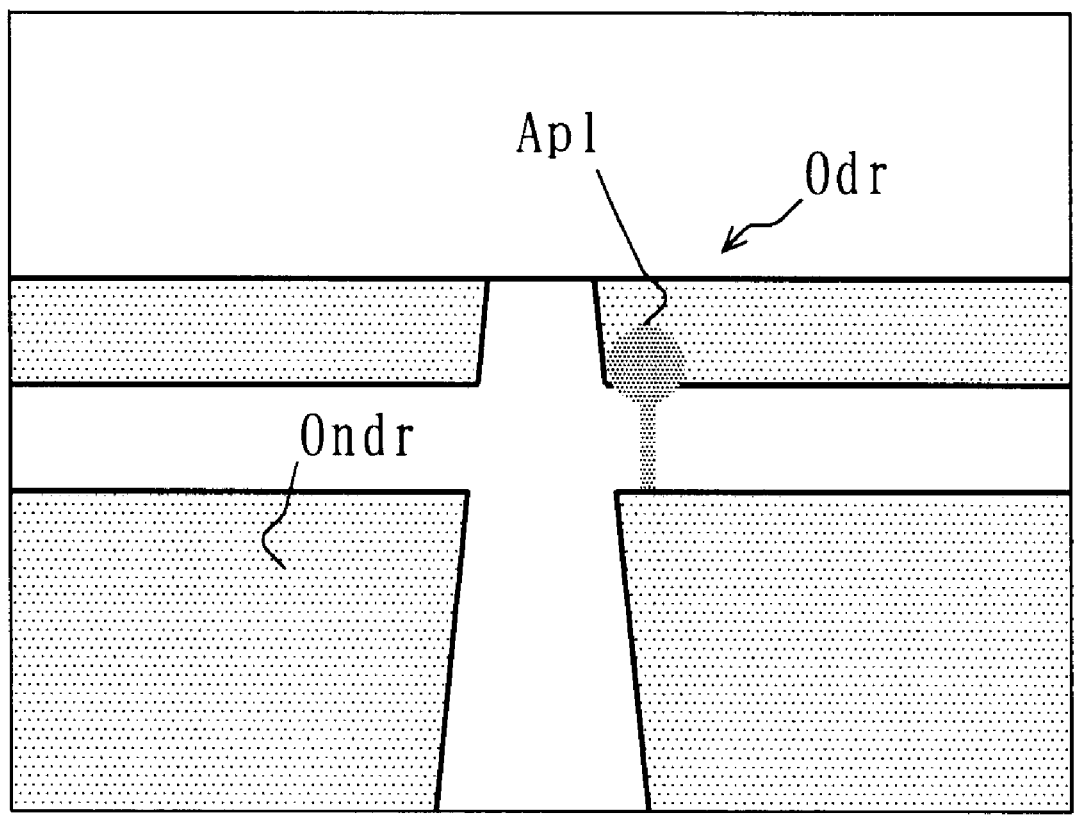
FIG. 21 is an illustration showing a plain plane Apl to be rendered in step S62 of FIG. 20.
Figure 22A:
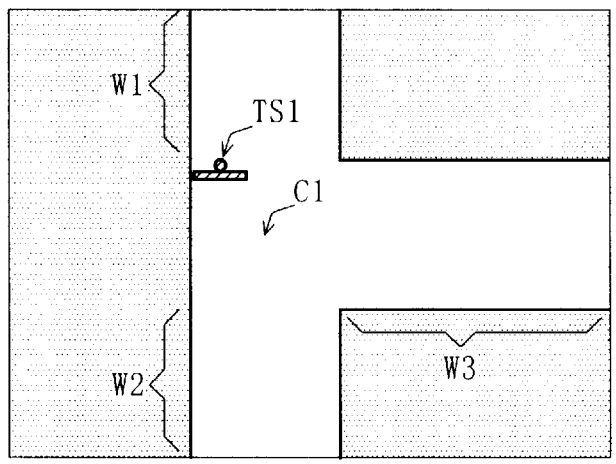
FIGS. 22A to 22C are illustrations demonstrating problems in conventional navigation devices.
Figure 22B:
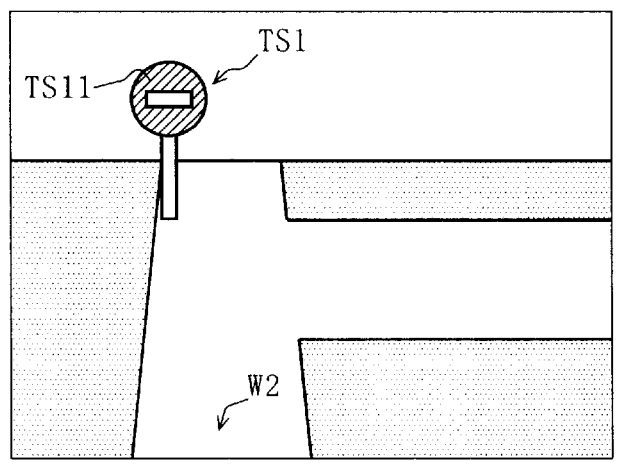
Figure 22C:
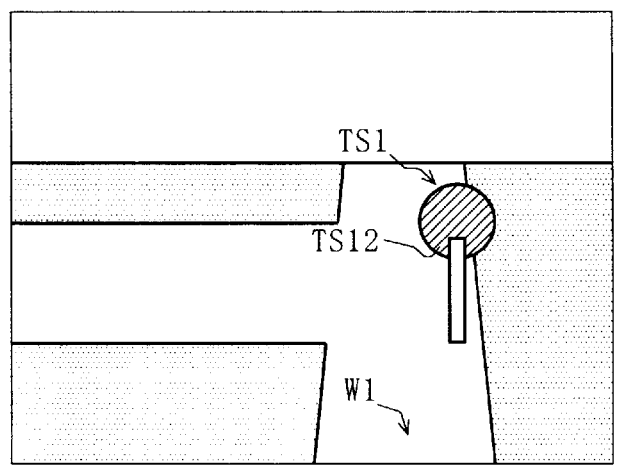

In step S62, the processor 1 first extracts the coordinates string information Icsp and the color information Iccp from the plain information Ipl in the currently selected directional object data Ddr. The processor 1 then specifies, in the frame memory, a rendering region defined by all of the three-dimensional coordinates (Xdrp, Ydrp, Zdrp) in the extracted coordinates string information Icsp. The processor 1 then assigns the rendering region the color specified by the extracted color information Iccp. In this manner, a piece of object part POdrp being, a part of the plain plane Apl is rendered. The processor 1 repeats this sequence of processes for every pair of the coordinates string information Icsp and the color information Iccp. As a result, the plain plane Apl of the directional object Odr is rendered in the frame memory. Then, the processor 1 extracts the size information Iszp from the plain information Ipl so that the plain plane Apl is adjusted in size based thereon. The resulting intermediate image data represents, as shown in FIG. 21, the plain plane Apl smaller than the message plane Ams of the directional object Odr. As such, by rendering the plain plane Apl smaller, the user can see the area therebehind with the resulting intermediate image data. The rendering device Urnd2 can also change the manner of rendering the directional objects Ddr based on the current position Pdtl so that the resulting three-dimensional map can be driver friendly.

In the second embodiment, the message plane Ams and the plain plane Apl presumably differ in size. Alternatively, the message plane Ams and the plain plane Apl may differ in shape or color.

In the above embodiments, the rendering devices Urnd1 and Urnd2 exemplary change the rendering manners based on the positional relationship between the user's current position and the directional object Ord. Specifically, the rendering devices Urnd1 and Urnd2 change the rendering manners whether the user is located toward the front or rear of the directional object Odr. Alternatively, the user's position may be determined in advance to see the positional relationship with the directional object Odr.

Further, in the above embodiments, the rendering devices Urnd1 and Urnd2 are exemplary incorporated into the navigation device Unv. Alternatively, those may be incorporated into any game machines displaying three-dimensional maps during car chase games, for example. If this is the case, there is no need to calculate the current position of the user, who moves. That is, the GPS receiver 5 and the autonomous navigation sensors 6 are not necessarily included in the rendering devices Urnd1 and Urnd2.

Further, the rendering devices Urnd1 and Urnd2 are receiving the directional object data Ddr from the storage 4 in the navigation device Unv in steps S12 and S42. This is not restrictive, and the rendering devices Urnd1 and Urnd2 may download the directional object data Ddr over a network typified by the Internet from the external server, for example, and store the data on the working area 3. Then, the procedure may go to step S12 or S42 and onward which means that the rendering devices Urnd1 and Urnd2 do not always require the storage 4.

In the above embodiments, the display image data Ddp and the guidance image data Dgd generated by the rendering devices Urnd1 and Urnd2 are transferred to the display 8 in the navigation device Unv. This is not restrictive, and the rendering devices Urnd1 and Urnd2 may transmit those data over the network to a navigation device located far away, and the navigation device may apply the display process to the received data. That means that the display 8 is not a necessary element for the rendering devices Urnd1 and Urnd2.

Further, the rendering program 21 and the navigation program 22 as described above may be distributed in the form of a recording medium typified by CD-ROMs, or over a network.

While the invention has been described in detail, the foregoing description is in all aspects illustrative and not restrictive. It is understood that numerous other modifications and variations can be devised without departing from the scope of the invention.

What is claimed is:

1. A rendering device for generating display image data which represents a map to be displayed on a display, comprising:
   first reception section for externally receiving directional object data representing a directional object, which is a structure element of said map, having a plurality of planes each facing a different direction, the directional object data including direction information specifying in which direction each of the planes is facing; and
   a rendering section for rendering, based on a relationship between a user's current position and the direction information specifying in which direction each of the planes is facing, each of the planes of the directional object in a different manner to generate said display image data.

2. The rendering device according to claim 1, wherein said rendering section renders each of the planes of the directional object in a different transparent gradient.

3. The rendering device according to claim 1, wherein the directional object data includes typical position information indicating a typical position at which the directional object is located, and
   said rendering section comprises:
      a second reception section for receiving the typical position information from the directional object data received by said first reception section,
      a second calculation section for calculating, based on the user's current position and the typical position information received by said second reception section, a reference vector which defines the direction of the directional object with respect to the user's current position;
      a third reception section for receiving the direction information from the directional object data received by said first reception section, and
      a third calculation section for calculating an inner product of the reference vector calculated in said second calculation section and the direction information received by said third reception section
   wherein, based on a sign of the inner product calculated in said third calculation section, each of the planes of the directional object is rendered in a different manner to generate said display image data.

4. The rendering device according to claim 1, wherein said rendering section renders opaque one of the planes of the directional object, and said rendering section renders the planes as a wire frame for each of the planes which are not rendered opaque.

5. The rendering device according to claim 1, wherein said rendering section renders each of the planes of the directional object represented by the directional object data received by said first reception section as a different size.

6. A rendering method for generating display image data which represents a map to be displayed on a display, comprising:
   externally receiving directional object data representing a directional object, which is a structure element of said map, having a plurality of planes each facing a different direction, the directional object data including direction information specifying in which direction each of the planes is facing;
   rendering, based on a relationship between a user's current position and the direction information specifying in which direction each of the planes is facing, each of the planes of the directional object in a different manner to generate said display image data.

7. A computer program for generating display image data which represents a map to be displayed on a display, comprising:
   externally receiving directional object data representing a directional object, which is a structure element of said map, having a plurality of planes each facing a different direction, the directional object data including direction information specifying in which direction each of the planes is facing;
   rendering, based on a relationship between a user's current position and the direction information specifying in which direction each of the planes is facing, each of the planes of the directional object in a different manner to generate said display image data.

8. The computer program according to claim 7, wherein said computer program is recorded on a recording medium.

9. A navigation device for guiding a user, comprising:
   a calculation section for calculating the user's current position;
   a reception section for externally receiving directional object data representing a directional object, which is a structure element of a map, having a plurality of planes each facing a different direction, the directional object data including direction information specifying in which direction each of the planes is facing;
   a rendering section for rendering each of the planes of the directional object in a different manner based on a relationship between the user's current position calculated by said calculation section and the direction information specifying in which direction each of the planes is facing, and generating display image data representing the map; and
   a display for displaying the map according to said display image data generated by said rendering section.

10. A navigation method for guiding a user using a map on a display, comprising:

calculating the user's current position;

externally receiving, directional object data representing a directional object, which is a structure element of said map, having a plurality of planes each facing a different direction, the directional object data including direction information specifying in which direction each of the planes is facing;

rendering each of the planes of the directional object in a different manner based on a relationship between the user's current position calculated in said calculating the user's position and the direction information specifying in which direction each of the planes is facing;

generating display image data representing the map; and transferring said display image data generated in said generating display image data to said display, wherein said display displays the map by applying a display process to the display image data transferred in said transferring said display image data.

11. A computer program for guiding a user using a map on a display, comprising:

calculating the user's current position;

externally receiving directional object data representing a directional object, which is a structure element of said map, having a plurality of planes each facing a different direction, the directional object data including direction information specifying in which direction each of the planes is facing rendering each of the planes of the directional object in a different manner based on a relationship between the user's current position calculated in said calculating the user's position and the direction information specifying in which direction each of the planes is facing;

generating display image data representing the map; and transferring said display image data generated in said generating display image data to said display, wherein said display displays the map by applying a display process to said display image data transferred in said transferring said display image data.

12. The computer program according to claim 11, wherein said computer program is recorded on a recording medium.

13. A rendering device for generating display image data which represents a map to be displayed on a display, comprising:

a reception section for externally receiving directional object data representing a directional object, which is a structure element of said map, having a plurality of planes each facing a different direction; and a rendering section for rendering, based on a relationship between a user's current position and the directional object represented by the directional object data received by said reception section, each of the planes of the directional object in a different manner to generate said display image data, wherein said rendering section renders each of the planes of the directional object in a different transparent gradient.

* * * * *

UNITED STATES PATENT AND TRADEMARK OFFICE
CERTIFICATE OF CORRECTION

PATENT NO. : 6,606,558 B2
DATED : August 12, 2003
INVENTOR(S) : Hiroyuki Hamada et al.

It is certified that error appears in the above-identified patent and that said Letters Patent is hereby corrected as shown below:

<u>Title page,</u>
Item [57], ABSTRACT,
Line 14, add -- . -- to end of sentence.

<u>Column 17,</u>
Line 36, add -- a -- before "first".
Lines 54, 58 and 67, change "," to -- ; --.

<u>Column 18,</u>
Line 4, add -- , -- after "section".

<u>Column 19,</u>
Line 2, replace "receiving, directional" with -- receiving directional --.
Line 27, "add -- ; -- after "facing".

Signed and Sealed this

Twenty-fifth Day of November, 2003

JAMES E. ROGAN
*Director of the United States Patent and Trademark Office*